(12) United States Patent
Kozuka

(10) Patent No.: US 12,138,841 B2
(45) Date of Patent: Nov. 12, 2024

(54) MOLDING SUPPORT DEVICE FOR INJECTION MOLDING MACHINE

(71) Applicant: NISSEI PLASTIC INDUSTRIAL CO., LTD., Nagano-ken (JP)

(72) Inventor: Makoto Kozuka, Hanishina-gun (JP)

(73) Assignee: NISSEI PLASTIC INDUSTRIAL CO., LTD., Nagano-ken (JP)

( * ) Notice: Subject to any disclaimer, the term of this patent is extended or adjusted under 35 U.S.C. 154(b) by 201 days.

(21) Appl. No.: 17/607,549

(22) PCT Filed: Jul. 22, 2019

(86) PCT No.: PCT/JP2019/028708
§ 371 (c)(1),
(2) Date: Oct. 29, 2021

(87) PCT Pub. No.: WO2021/014544
PCT Pub. Date: Jan. 28, 2021

(65) Prior Publication Data
US 2022/0219366 A1 Jul. 14, 2022

(51) Int. Cl.
*B29C 45/78* (2006.01)
*B29C 45/18* (2006.01)

(52) U.S. Cl.
CPC ............. *B29C 45/78* (2013.01); *B29C 45/18* (2013.01); *B29C 2945/76531* (2013.01); *B29C 2945/76662* (2013.01); *B29C 2945/76832* (2013.01)

(58) Field of Classification Search
CPC ............... B29C 45/78; B29C 45/18; B29C 2945/76531; B29C 2945/76662; B29C 2945/76832
See application file for complete search history.

(56) References Cited

U.S. PATENT DOCUMENTS

| 5,078,929 A * | 1/1992 | Matsumae | ............ C04B 35/638 264/40.1 |
| 2004/0089964 A1* | 5/2004 | Yamagiwa | .............. B29C 45/78 264/40.1 |

(Continued)

FOREIGN PATENT DOCUMENTS

| JP | 6-179232 A | 6/1994 |
| JP | 2005-22260 A | 1/2005 |

(Continued)

OTHER PUBLICATIONS

English translation of JP 2017165028 (Year: 2017).*
International Search Report, issued in PCT/JP2019/028708, dated Oct. 8, 2019.

*Primary Examiner* — Alison L Hindenlang
*Assistant Examiner* — Adrien J Bernard
(74) *Attorney, Agent, or Firm* — Birch, Stewart, Kolasch & Birch, LLP

(57) ABSTRACT

The molding support device for an injection molding machine is provided with: a temperature control unit which controls the temperature of a material supply unit which supplies a resin material to the inside of a heating cylinder; a basic data input unit which can input resin type; a Controlled temperature data table in which the optimum control temperature by the temperature control unit is set for each resin type; a data processing unit having a temperature setting processing unit which sets the control temperature of the temperature control unit as the control temperature of the temperature control unit by reading the control temperature corresponding to resin type input from the Controlled temperature data table if the resin type is input from the basic data input unit when molding conditions are set, and a molding machine controller having an output processing function unit which displays the control temperature on a display.

19 Claims, 12 Drawing Sheets

(56) References Cited

U.S. PATENT DOCUMENTS

2004/0258786 A1    12/2004  Senda et al.
2012/0053718 A1*   3/2012   Grimm .................. B29C 45/73
                                                        700/103

FOREIGN PATENT DOCUMENTS

| JP | 2005-28868 A | 2/2005 | | |
|---|---|---|---|---|
| JP | 2006-272600 A | 10/2006 | | |
| JP | 2014-30956 A | 2/2014 | | |
| JP | 2015-123668 A | 7/2015 | | |
| JP | 2017-165028 A | 9/2017 | | |
| JP | 2017165028 | * | 9/2017 | ............ B29C 47/62 |
| JP | 2017-209880 A | 11/2017 | | |

\* cited by examiner

EASINESS OF ADHESION

| SCREW SURFACE METAL | RESIN TYPE | | | | |
|---|---|---|---|---|---|
| | PP | POM | ABS | GPPS | LDPE |
| Cr | 1 | 2 | 3 | 4 | 2 |
| CrN | 2 | 3 | 4 | 4 | 1 |
| TiN | 3 | 1 | 2 | 4 | 2 |
| TiC | 4 | 2 | 1 | 4 | 3 |

EASINESS OF DECMPOSITION

| SCREW SURFACE METAL | RESIN TYPE | | | | |
|---|---|---|---|---|---|
| | PP | POM | ABS | GPPS | LDPE |
| Cr | 1 | 1 | 1 | 1 | 1 |
| CrN | 2 | 2 | 2 | 2 | 2 |
| TiN | 3 | 3 | 3 | 3 | 3 |
| TiC | 4 | 4 | 4 | 4 | 4 |

MOLDING SUPPORT DEVICE FOR INJECTION MOLDING MACHINE

TECHNICAL FIELD

The present invention relates to a molding support device for an injection molding machine suitable for supporting an injection molding machine that injects and fills a metal mold with a plasticized molten resin with a screw and performs molding.

BACKGROUND ART

In general, an injection molding machine performs molding by injecting and filling a metal mold with a plasticized molten resin with a screw. Thus, whether or not the molten state of the molten resin is maintainable in an appropriate state is an important factor for ensuring the desired molding quality. In particular, when plasticization excessively progresses, the resin decomposition rate increases and results in problems such as degeneration (carbonization, etc.) of the molten resin and unnecessary gas generation. Such problems are closely related to the molding conditions and retention time of the molten resin, and if the molding conditions are not suitable or the retention time is prolonged, there is a risk of increasing the resin decomposition rate when the plasticization progresses excessively. Therefore, techniques for grasping the state of the molten resin in the heating cylinder and performing necessary countermeasure processing have also been proposed by, for example, the injection molding machine disclosed in Patent Publication 1 and the plasticization simulation device disclosed in Patent Publication 2.

On the other hand, the state of the molten resin in the heating cylinder is also affected by the temperature (resin material temperature) of the resin material (pellet material) fed into the heating cylinder. Thus, a technique for controlling the resin material temperature has also been proposed to stabilize or adjust the temperature of the temperature control unit attached to the material supply unit in front of the heating cylinder (screw).

Conventionally, this technique type is known as the hopper flange of an injection molding machine disclosed in Patent Publication 3 and a temperature control device for the temperature control unit under a hopper of an injection molding machine disclosed in Patent Publication 4. The hopper flange disclosed in Patent Publication 3 intends to increase and stabilize the temperature of the hopper flange quickly to increase the temperature of the lower part of the hopper, thereby improving the plasticizing capacity and realizing stable plasticization of resin. Specifically, a rod-shaped heater is installed in the front stage of the hopper flange, a cooling water pipe is installed in the rear stage of the hopper flange, and a thermocouple is installed in the central position of the hopper flange to control the temperature of the hopper flange in the range of 70° C. to 130° C.

Further, the temperature adjusting device disclosed in Patent Publication 4 has a temperature adjusting device main body connected by a pipe to a cooling hole provided in a temperature adjusting unit at the lower part of the hopper, and the temperature adjusting device main body has a cooling medium tank, a pump, a radiator, and a fan driven by a motor for sending cold air against the radiator, and the cooling medium circulates between the temperature adjusting unit at the lower part of the hopper and the main body of the temperature adjusting device by the drive of the pump, and a temperature sensor is provided in the temperature adjusting unit at the lower part of the hopper, and when the temperature detected by the temperature sensor is higher than the set temperature, the cooling medium circulating by the fan is cooled, and the temperature of the temperature adjusting unit at the lower part of the hopper is feedback-controlled by a control device for controlling the injection molding machine.

PRIOR ART PUBLICATIONS

Patent Publications

Patent Publication 1: Japanese Unexamined Patent Application Publication No. 2005-022260
Patent Publication 2: Japanese Unexamined Patent Application Publication No. 2015-123668
Patent Publication 3: Japanese Unexamined Patent Application Publication No. 2006-272600
Patent Publication 4: Japanese Unexamined Patent Application Publication No. 2005-28868

DISCLOSURE OF THE INVENTION

Problem to be Solved by the Invention

However, the above-described technique for stabilizing or adjusting the temperature of the temperature control unit in the material supply unit has the following problems.

First, the temperature control of the material supply unit (material drop port and hopper) is from the viewpoint of preliminary heating in the previous stage of supplying resin material to the inside of the heating cylinder, and is in consideration of efficiency improvement or stabilization in the heating cylinder processing in the subsequent stage. Therefore, the temperature control is fundamentally independent of the material supply unit. The temperature control is from the viewpoint of stably and accurately maintaining the set target temperature (control temperature). Thus, it is not always possible to set an accurate control temperature, and there is room for further improvement from the viewpoint of efficiency and stability of the heating cylinder processing.

Second, the heating temperature in the heating cylinder is usually set for each heating unit (band heater) provided in the nozzle unit, head unit, front unit, intermediate unit, and rear unit, respectively, to obtain the predetermined temperature distribution in the axial direction of the heating cylinder. Accordingly, the molten state of the resin in the heating cylinder is further optimizable by further optimizing the temperature of the resin material supplied from the material supply unit that affects the heating cylinder side, that is, the temperature controlled by the temperature control unit attached to the material supply unit with the overall molding conditions, the temperature control of the heating cylinder side, resin type, etc. However, since the conventional temperature control unit does not have such a cooperative concept, it is difficult to expand the range of adjustment of the entire molding conditions and make the adjustment more precise.

Consequently, there is a limit to improve the high plasticization quality and the molding quality.

The object of the present invention is to provide a molding support device for an injection molding machine to solve such problems existing in the background art.

Means for Solving the Problem

To solve the above-described problems, the present invention provides a molding support device 1 for an injection molding machine that performs molding support for an injection molding machine M which injects plasticized molten resin with a screw 3 into a metal mold 2 to mold the resin. The molding support device 1 is characterized by comprising: a temperature control unit 6 that controls the temperature of the material supply unit 5 that supplies the resin material R to the inside of the heating cylinder 4; a basic data input unit Fi, in which the user can input at least the resin type; a Controlled temperature data table DT in which the optimum control temperature Tr set for each resin type by the temperature control unit 6, a data processing unit F that has a temperature setting processing unit Fcs, which sets the control temperature Tr as the control temperature Tr of the temperature control unit 6 by reading out the control temperature Tr corresponding to the resin type input from the Controlled temperature data table DT, if the resin type is input from the basic data input unit Fi when at least setting the molding conditions and the molding machine controller 10 having an output processing function unit Fd for displaying the control temperature Tr at least on the display 7 are provided.

In this case, according to the preferred embodiment of the invention, the material supply unit 5 may include at least one or both of the hopper 5h attached to the heating cylinder 4, the material supply device Prm, and the material drop port 5d of the heating cylinder 4, and the pellet material Rp may be applied to the resin material R. Further, the upper limit value Tru of the control temperature Tr can be set in the Controlled temperature data table DT, and a control temperature manual input function capable of manually inputting at least the lower limit value Trm of the control temperature Tr can be provided in the basic data input unit Fi. Further, the basic data input unit Fi can input basic data Do including at least the molding condition data Dm relating to the molding conditions and the screw data Ds relating to the form of the screw 3. On the other hand, the data processing unit F can set the Solid-phase rate operation expression data Dc for calculating the solid-phase rate Xc of the molten resin in the heating cylinder 4 based on the basic data Do, and can also provide a solid-phase rate calcutation processing function unit Fcp to obtain the estimated solid-phase rate Xcs of the molten resin at the end of measurement by calcutation processing based on the basic data Do and the Solid-phase rate operation expression data Dc. On the other hand, the screw data Ds can include data relating to the material type of the screw surface $3f$, which enables providing the data processing unit F with the Decomposition rate operation expression data Dr for determining the resin decomposition rate Xr of the screw surface $3f$ during molding based on the basic data Do, and with a decomposition rate calcutation processing function unit Fcr for determining the estimated resin decomposition rate Xrs based on the basic data Do and the Decomposition rate operation expression data Dr. Further, it is possible to provide the data processing unit F with a determination processing unit Fcj for determining the degree of the estimated solid-phase rate Xcs and/or the estimated resin decomposition rate Xrs and outputting the result of the determination processing, and it is also possible to provide the output processing function unit Fd with a data display unit 8, including a determination result display unit $8j$ for displaying the result of the determination processing output from the determination processing unit Fcj.

Further, it is possible to provide the data processing unit F with the Increased temperature operation expression data Dw for obtaining the estimated temperature increase ΔTus based on the data relating to the amount of shear heating E used in the calcutation processing based on the Decomposition rate operation expression data Dr, and it is also possible to provide the data processing unit F with the temperature increase calcutation processing function unit Fct for obtaining the estimated temperature increase ΔTus based on the calcutation processing based on the Increased temperature operation expression data Dw. Therefore, it is possible to provide the output processing function unit Fd with the temperature increase display unit $8fu$ for displaying the estimated temperature increase ΔTus obtained by the temperature increase calcutation processing function unit Fct on the display 7. On the other hand, it is possible to provide the data processing unit F with resin-temperature conversion formula data for converting the control temperature Tr into the resin-material temperature Tro based on at least some of the shape data of the resin-material R in the molding condition data and molding cycle time data, and it is also possible to provide the data processing unit F with a resin-temperature conversion processing function for determining the resin-material temperature Tro by the conversion processing based on the resin-temperature conversion processing function. Therefore, it is possible to provide the output processing function unit Fd with a resin material temperature display unit8 to for displaying the resin material temperature Tro obtained by the resin temperature conversion processing function on the display 7.

Effects of the Invention

The molding support device 1 for the injection molding machine according to the present invention has the following remarkable effects.

(1) Setting a temperature setting processing unit (Fcs) which sets a control temperature (Tr) corresponding to the resin material type input read out from a Controlled temperature data table (DT), if a Controlled temperature data table (DT) which sets an optimum control temperature (Tr) by a temperature control unit (6) for controlling the temperature of a material supply unit (5) for supplying a resin material (R) to the inside of a heating cylinder (4) for each resin material type and the resin material type are input from a basic data input unit (Fi) at least when setting the molding conditions, it becomes possible to set the setting of the optimal (adequate) control temperature (Tr) which is suitable for the resin type and improve the efficiency and stability of the whole processing in the heating cylinder 4.

(2) Since the control temperature Tr in the temperature control unit 6 is displayed at least on the display 7, the operator can check the control temperature Tr and change (adjust) the control temperature Tr using a support function such as changing the molding conditions in the molding support device 1 or arbitrarily by a manual from the viewpoint of further enhancing the plasticization quality.

Since the control temperature Tr can be changed to change the molding conditions, the range of adjustment of the entire molding conditions can be widened, thereby ensuring high molding quality by further improving the plasticization quality.

(3) According to the preferred embodiment, if the material supply unit 5 includes at least one or both of the hopper 5h attached to the heating cylinder 4, the material supply device Prm, and the material drop port 5d of the heating cylinder 4, these three material supply means can be selected as the temperature control target by the temperature control unit 6 to enhance the flexibility and ease of implementation without being limited by the structure of the injection molding machine M. In particular, when it is difficult to change the heating temperature of the heating cylinder 4, the molding cycle time, etc., the above approach is a useful adjusting means (setting changing means).

(4) According to the preferred embodiment, applying the pellet material Rp to the resin material R can make the pellet material Rp which is widely spread and has a regular shape such as a cylindrical shape as a target, enabling an easy and accurate estimation of the temperature of the temperature-controlled pellet material Rp itself and an accurate setting of the control temperature Tr.

(5) According to the preferred embodiment, setting the upper limit value Tru of the control temperature Tr in the Controlled temperature data table DT enables automatic setting of the control temperature of the more important one (upper limit value Tru) in the case of controlling the control temperature Tr by setting the upper limit value Tru and the lower limit value Trm. Thus, adequate control of the control temperature (target temperature) is possible even when various methods are employed.

(6) According to the preferred embodiment, providing the basic data input unit Fi with a control temperature manual input function capable of manually inputting at least the lower limit value Trm of the control temperature Tr enables arbitrary setting of the lower limit value Trm in the case of automatically setting the upper limit value Tru by manual input and facilitates the manual setting of the entire control temperature Tr (the upper limit value Tru and the lower limit value Trm) as needed.

(7) According to the preferred embodiment, providing the basic data input unit Fi with a function of inputting the basic data Do including at least the molding condition data Dm relating to the molding conditions and the screw data Ds relating to the configuration of the screw 3 enables collecting sufficient data for grasping the molten state of the molten resin in the heating cylinder 4 and reliably obtaining accurate estimated solid-phase rates Xcs and estimated resin decomposition rates Xrs indicating the molten state of the required resin (molten resin).

(8) According to the preferred embodiment, providing the data processing unit F with the Solid-phase rate operation expression data Dc for calculating the solid-phase rate Xc of the molten resin in the heating cylinder 4 based on the basic data Do and the Solid-phase rate operation expression data Dc and with the solid-phase rate calcutation processing function unit Fcp for obtaining the estimated solid-phase rate Xcs of the molten resin at the end of measurement by the calcutation processing based on the basic data Do and the Solid-phase rate operation expression data Dc enables accurate (quantitative) grasping the plasticization shortage of the resin by the estimated solid-phase rate Xcs obtained based on the basic data Do and taking appropriate measures against the plasticization shortage. In particular, since the above approach does not need human determination, such as experience, even a beginner operator with little experience can improve the yield rate and molding quality of the molded product, thus perform more desirable molding (production). Further, reflecting the physical properties (melting characteristics, etc.) of each resin material R type in calculating the estimated solid-phase rate Xcs allows for obtaining the estimated solid-phase rate Xcs more accurately.

(9) According to the preferred embodiment, including data relating to the material type of the screw surface $3f$ in the screw data Ds allows for reflecting the deterioration factor caused by the catalytic effect of the metal material of the screw surface $3f$ on the molten resin and the easiness of adhesion in the calcutation process, enabling more accurate estimation of the molten state.

(10) According to the preferred embodiment, providing the data processing unit F with the Decomposition rate operation expression data Dr for determining the resin decomposition rate Xr of the screw surface $3f$ during molding based on the basic data Do and with a decomposition rate calcutation processing function unit Fcr for determining the estimated resin decomposition rate Xrs by the calcutation processing based on the basic data Do and the Decomposition rate operation expression data Dr, facilitates determining the estimated resin decomposition rate Xrs, for example, enables using the basic data Do used for the calcutation processing of the Solid-phase rate operation expression data Dc for the calcutation processing of the Decomposition rate operation expression data Dr. Further, the estimated resin decomposition rate Xrs easily obtained by the calcutation processing allows accurate grasping of the molten resin degradation state. As a result, it is possible to set the proper range of the molten state by both the limit point on one side (insufficient plasticization side) of the molten state based on the estimated solid-phase rate Xcs and the limit point on the other side (excessive plasticization side) of the molten state based on the estimated resin decomposition rate Xrs, allowing stabilizing and improving the molding property and molding quality.

(11) According to the preferred embodiment, providing the data processing unit F with the determination processing unit Fcj, which judges the degree of the estimated solid-phase rate Xcs and/or the estimated resin decomposition rate Xrs and outputs the result of the determination processing, the operator can easily grasp the molten state of the molten resin which is difficult to judge; therefore, it is possible to perform the necessary countermeasure processing quickly.

(12) According to the preferred embodiment, providing the output processing function unit Fd with the data display unit 8 including the determination result display unit $8j$ for displaying the result of the determination processing output from the determination processing unit Fcj enables the operator to confirm the result of the determination processing by visual means, so that even an inexperienced operator can easily and reliably confirm whether or not the molten state of the molten resin is appropriate, and can quickly take necessary measures such as changing the setting of the molding conditions, thereby improving the efficiency and efficiency of the molded article production.

(13) According to the preferred embodiment, providing the data processing unit F with the Increased temperature operation expression data Dw for obtaining the estimated temperature increase $\Delta Tu$ based on the data relating to the shear heating E used in the calcutation processing using the Decomposition rate operation expression data Dr and with the temperature increase calcutation processing function unit Fct for obtaining the estimated temperature increase $\Delta Tus$ by the calcutation processing based on the Increased temperature operation expression data Dw allows for utilizing the data relating to the shear heating value E used in the calcutation processing using the Decomposition rate operation expression data Dr in the calcutation processing of the Increased temperature operation expression data Dw and facilitates obtaining the estimated temperature increase $\Delta Tus$.

(14) According to the preferred embodiment, providing the output processing function unit Fd with the increasing temperature display unit $8fu$ for displaying the estimated temperature increase $\Delta Tus$ obtained by the increase temperature calcutation processing function unit Fct on the display 7 allows for checking the information related to the estimated temperature increase $\Delta Tus$ in addition to information related to the estimated solid-phase rate Xcs and/or the estimated resin decomposition rate Xrs, enabling more accurate grasping the molten state of the molten resin.

(15) According to the preferred embodiment of the present invention, providing the data processing unit (F) with a function for converting the control temperature (Tr) temperature-adjusting temperature (Tr) into the resin-material temperature (Tro) on the basis of at least some of the shape data of the resin-material (R) in the molding condition data and the molding cycle time data, and also with a resin-temperature-conversion-type function for obtaining the resin-material temperature (Tro) by conversion processing based on the resin-temperature-conversion-type function enables estimating the resin-material temperature (Tro) on the basis of the obtained temperature-adjusting temperature (Tr); therefore, it is possible to accurately grasp the information relating to the temperature state of the resin-material temperature (Tro) itself based on the temperature state, that is, the relationship between the estimated solid-phase rate (Xcs) and/or the estimated resin decomposition rate (Xrs) and the estimated temperature increase (ΔTus).

(16) According to the preferred embodiment, providing the output processing function unit Fd with the resin material temperature display unit 8*to* for displaying the resin material temperature Tro obtained by the resin temperature conversion processing function in the data processing unit F on the display 7 facilitates confirming the resin material temperature Tro can by visual observation; further, it is possible to confirm information compared with other information easily, that is, the estimated solid-phase rate Xcs and/or the estimated resin decomposition rate Xrs and the estimated temperature increase ΔTus.

DESCRIPTION OF REFERENCE NUMERALS

1: molding support device, 2: metal mold, 3: screw, 3*f*: screw surface, 4: heating cylinder, 5: material supply unit, 5*h*: hopper, 5*d*: material drop port, 6: temperature control unit, 6*p*: material temperature control unit, 7: display, 8: data display unit, 8*j*: determination result display unit, 8*fu*: temperature increase display unit, 8*to*: resin material temperature display unit, 10: molding machine controller, M: injection molding machine, R: resin material, Rp: pellet material, F: data processing unit, Fi: basic data input unit, Fd: output processing function unit, Fcs: temperature setting processing unit, Fcp: solid-phase rate calcutation processing function unit, Fcf: temperature setting processing unit, Fcj: determination processing unit, Fct: temperature incease calcutation processing function unit, Tr: control temperature, DT: Controlled temperature data table, Dm: molding condition data, Ds: screw data, Do: basic data, Dc: Solid-phase rate operation expression data, Dr: Decomposition rate operation expression data, Dw: Increased temperature operation expression data, Xc: solid-phase rate, Xr: resin decomposition rate, Xcs: estimated solid-phase rate, Xrs: estimated resin decomposition rate, ΔTus: estimated temperature increase, material supply equipment Prm

BEST MODE FOR CARRYING OUT THE INVENTION

Next, the preferred embodiments of the present invention will be described in detail with reference to the drawings.

First, in order to facilitate understanding of the molding support device 1 according to the present embodiment, an outline of an injection molding machine M capable of using the molding support device 1 will be described with reference to FIG. 2.

Figure 2:
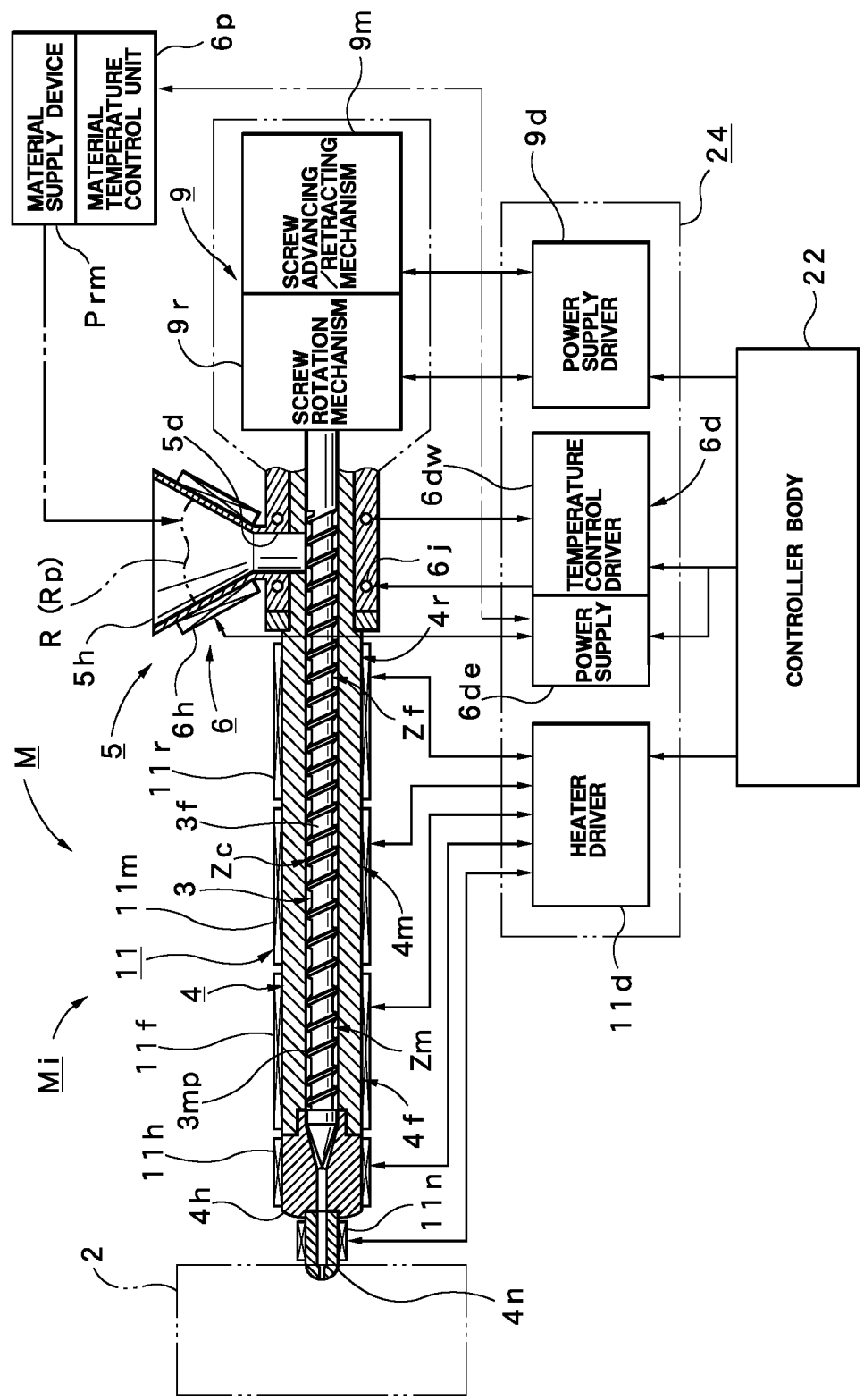
FIG. 2 is a structural view showing a mechanical structure of an injection molding machine, including the molding support device.

FIG. 2 shows an injection molding machine M, particularly an injection apparatus Mi in which a mold clamping apparatus is omitted. In the injection device Mi, the reference numeral 4 denotes a heating cylinder. A nozzle 4n is attached to the front end unit of the heating cylinder 4 via a head unit 4h. The nozzle 4n functions to inject the molten resin inside the heating cylinder 4 into the metal mold 2 indicated by the imaginary line. A hopper 5h is provided above the rear end of the heating cylinder 4. A material drop port 5d penetrating the heating cylinder 4 is formed between the lower end opening of the hopper 5h and the inside of the heating cylinder 4. As a result, the hopper 5h and the inside of the heating cylinder 4 communicate with each other through the material 5d. The resin material R indicated by the imaginary line in the hopper 5h is supplied to the inside of the heating cylinder 4 through the material dropping port 5d. Although the hopper 5h is illustrated, a material supply device Prm shown in FIG. 2 may be used instead of the hopper 5h. When the material supply device Prm is used, in FIG. 2, the hopper 5h is removed from the hopper attachment unit of the heating cylinder 4, and a material supply device Prm is provided instead. The material supply device (Prm) injects the resin material R stored in the separately disposed material tank into the material drop port (5d) by a fixed amount using an injecting adapter. Accordingly, the hopper 5h or the material supply device Prm and the material drop port 5d constitute the material supply unit 5 of the present embodiment for supplying the resin material R into the heating cylinder 4.

On the other hand, a heater 6h for heating the resin material R contained in the hopper 5h is attached to the outer peripheral surface of the hopper 5h. A water jacket 6j is formed in the heating cylinder 4 around the material drop port 5d. The heater 6h is connected to the power supply circuit 6de of the temperature control driver 6d; the water jacket 6j is connected to the temperature control water circulation circuit 6dw of the temperature control driver 6d. The temperature control water circulation circuit 6dw can adjust (heat or cool) the temperature of the pellet material Rp passing through the material dropping port 5d by circulating the temperature-controlled water medium (hot water or cooling water) in the water jacket 6j. Further, the power supply circuit 6de and the temperature control water circulation circuit 6dw are respectively connected to the controller main body 22. As a result, the control commands for the power supply circuit 6de and the temperature control water circulation circuit 6dw are given from the controller main body 22 to the temperature control driver 6d. A temperature sensor (not shown) detects the control temperature Tr, and this detection signal is applied to the temperature adjustment driver 6d. Accordingly, the heater 6h, water jacket 6j, and temperature control driver 6d constitute a temperature control unit 6 for controlling the temperature of the material supply unit 5.

Since the material temperature control unit 6p using a heater, etc. is attached to the material supply device Prm, the material temperature control unit 6p is connected to the power supply circuit 6de of the temperature control driver 6d. Thus, the control body 22 described later in the injection molding machine M enables the temperature control for the material temperature control unit 6p, and, in particular, the temperature control integrated with the temperature control for the heater 6h and the water jacket 6j.

Figure 3:
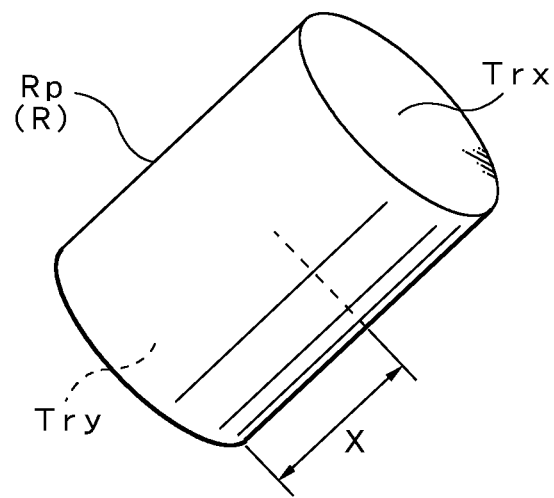
FIG. 3 is a schematic perspective view of a pellet material which is a resin material used in the injection molding machine.

The cylindrical pellet material Rp shown in FIG. 3 is applied to the resin material R. Applying such a pellet material Rp allows targeting the pellet material Rp, which is widely spread and has a regular shape such as a cylindrical shape, facilitates accurately estimating the temperature of the temperature-controlled pellet material Rp itself and accurately setting the control temperature Tr.

In the present embodiment, the hopper 5h or the material supply unit Prm and the material drop port 5d are defined as the material supply unit 5; however, any one of the hopper 5h, the material drop port 5d and the material supply unit Prm may be defined as the material supply unit 5, or both the hopper 5h and the material drop port 5d or both the material supply unit Prm and the material drop port 5d may be defined as the material supply unit 5. Therefore, the temperature control unit 6 attached to the material supply unit 5 can also control either or both of the hopper 5h, the material supply device Prm, and the material drop port 5d. For example, the heater 6h and the material temperature control unit 6p may be removed or not used from the exemplary configuration; only the water jacket 6j may be a temperature control target by the temperature control unit 6, or the water jacket 6j may be not used; only the material temperature control unit 6p or the heater 6h may be a temperature control target by the temperature control unit 6. As a result, selecting each of the material supply means of the hopper 5h, the material supply device Prm, and the material drop port 5d as the temperature control target by the temperature control unit 6 enhances flexibility and ease of implementation without being limited by the structure of the injection molding machine M. In particular, when it is difficult to change the heating temperature of the heating cylinder 4, the molding cycle time, etc., the approach above is a useful adjusting means (setting changing means).

On the other hand, a screw 3 is mounted inside the heating cylinder 4 to be rotatable and retractable. A helical flight unit 3mp is formed on the outer peripheral surface of the screw 3, and the screw surface 3f is coated with a predetermined surface material (metal) in consideration of durability, etc. The screw 3 has a metal-ring zone Zm, a compression zone Zc, and a feed zone Zf from the front side to the rear side. On the other hand, the rear end unit of screw 3 is coupled to the screw drive unit 9. The screw drive unit 9 includes a screw rotation mechanism 9r for rotating the screw 3 and a screw advancing/retracting mechanism 9m for advancing and retracting the screw 3. Although the drive system of the screw rotation mechanism 9r and the screw advancing/retracting mechanism 9m is illustrated as an electric system using an electric motor, it may be a hydraulic system using a hydraulic circuit, and the drive system is not restricted. The screw rotation mechanism 9r and the screw advancing/retracting mechanism 9m are connected to the power supply driver 9d, and the power supply driver 9d is connected to the controller body 22. As a result, the controller body 22 gives a control command for the screw rotation mechanism 9r and the screw advance/retreat mechanism 9m to the power supply driver 9d. A speed sensor and a position sensor (not shown) detect physical quantities such as the speed and the position of the screw 3, and the detection signal is applied to the power supply driver 9d.

Further, the heating cylinder 4 has a heating cylinder front unit 4f, a heating cylinder central unit 4m, and a heating cylinder rear unit 4r from the front side to the rear side, and a front heating unit 11f, a central heating unit 11m, and a rear heating unit 11r are respectively attached to the outer peripheral surfaces of the respective units 4f, 4m, and 4r. Similarly, a head heating unit 11h is provided on the outer peripheral surface of the head unit 4h, and a nozzle heating unit 11n is provided on the outer peripheral surface of the nozzle 4n. The heating units 11f, 11m, 11r, 11h, and 11n can be constituted by band heaters, etc. Accordingly, the nozzle heating unit 11n, the head heating unit 11h, the front heating unit 11f, the central heating unit 11m, and the rear heating unit 11r constitute the heating group unit 11. The heating group 11 is connected to the heater driver 11d, and the heater driver 11d is connected to the controller body 22. Thus, the control commands for the heating units 11f, 11m, 11r, 11h, and 11n are given from the controller body 22 to the heater driver 11d, and the heating temperature is detected by a temperature sensor (thermocouple, etc.) (not shown), and the detection signal is given to the heater driver 11d.

Figure 1:
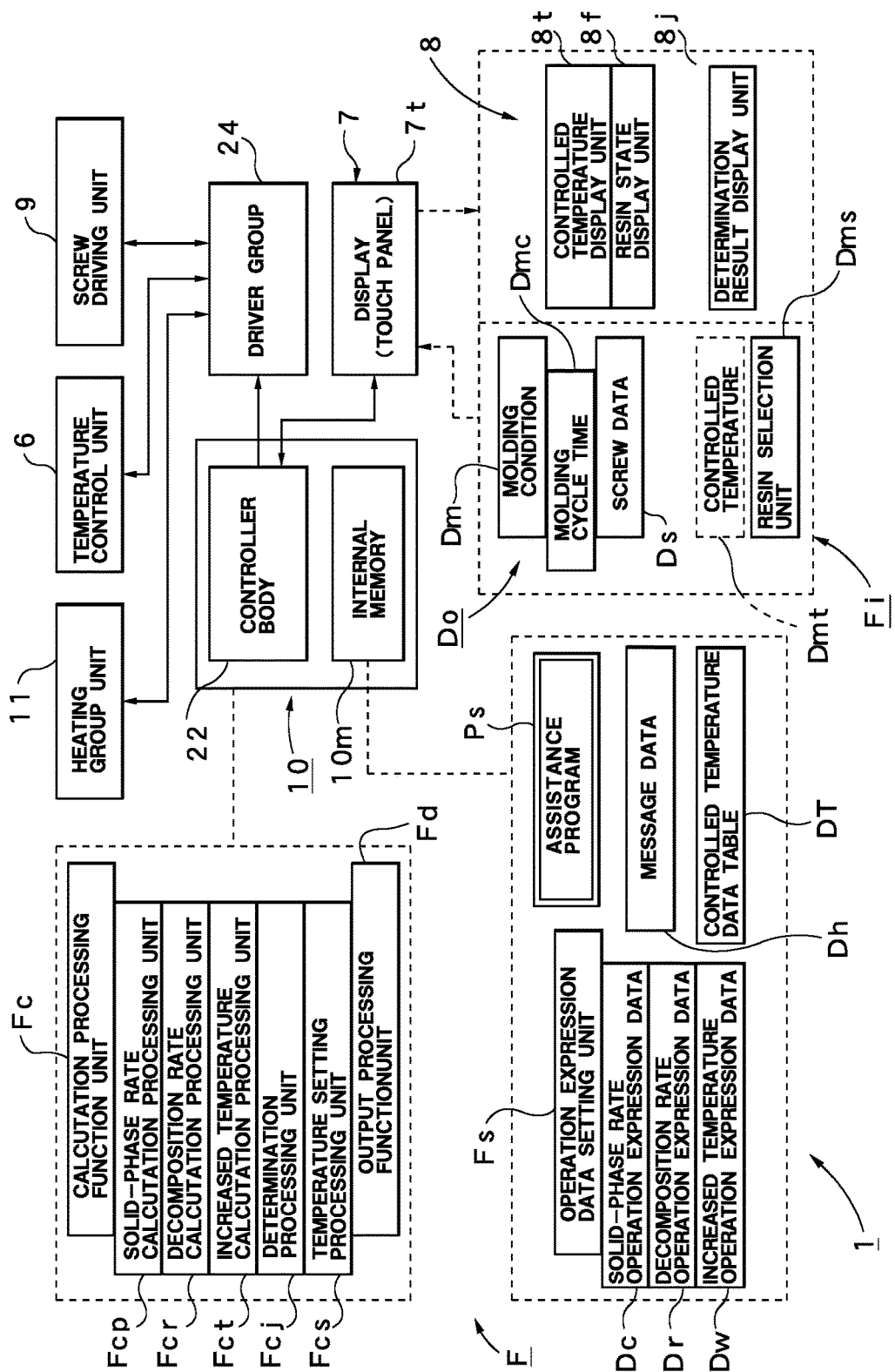
FIG. 1 is a block diagram of a processing system (control system) in a molding support device for an injection molding machine According to the preferred embodiment of the present invention.

FIG. 1 shows a molding machine controller 10, which controls the entire injection molding machine M. The molding machine controller 10 includes a controller main body 22 having a computer function including hardware such as a CPU and an internal memory 10m, and a display 7 is connected to the controller main body 22. Display 7 can display necessary information and is provided with a touch panel 7t, which can perform various input operations such as input, setting, and selection. A driver group 24 for driving (operating) various actuators is connected to the controller body 22. A driver group 24 includes a temperature control driver 6d including the power supply circuit 6 de and the temperature control water circulation circuit 6dw shown in FIG. 2, a power supply driver 9d, and a heater driver 11d.

Accordingly, the molding machine controller 10 includes the HMI control system and the PLC control system, and the internal memory 10m stores the PLC program and the HMI program. The PLC program executes sequence operations of various processes in the injection molding machine M, monitoring of the injection molding machine M, etc., and the HMI program executes setting and display of the operation parameters of the injection molding machine M, display of the operation monitoring data of the injection molding machine M, etc.

Next, with reference to FIGS. 1-16, a description will be given of the configuration of the molding support device 1 according to the present embodiment, which can be used for such an injection molding machine M.

The molding support device 1, according to the present embodiment, includes a molding machine controller 10 and peripheral actuators shown in FIG. 1. Therefore, the internal memory 10m of the molding machine controller 10 stores a Assistance program Ps by an application program which causes the molding support device 1 to function.

The molding support device 1 fundamentally has a basic function for maintaining the molten state of the resin in the heating cylinder 4 in an optimum state. In addition, in the present embodiment, optimizing the control temperature Tr of the temperature control unit 6 for controlling the temperature of the pellet material Rp supplied to the heating cylinder 4 constructs the molding support device 1 capable of further optimizing the basic function.

Therefore, in order to facilitate the understanding of the molding support device 1 according to the present embodiment, first, the basic functions of the molding support device 1 will be described.

As shown in FIG. 1, the molding support device 1 having the basic function includes a basic data input unit Fi for inputting basic data Do including, at a minimum, molding condition data Dm relating to the molding conditions and screw data Ds relating to the form of the screw 3. The basic data input unit Fi can use a touch panel 7t attached to the display 7. Since display 7 displays an input screen (not shown), necessary numerical values can be input or selected through the touch panel 7t.

In this case, the molding condition data Dm includes various data relating to molding conditions for molding by the injection molding machine M, specifically, basic data relating to various physical quantities such as a melt flow rate, a screw rotation number, a measuring time, a back pressure, a measuring position, a front part temperature, a middle part temperature, a rear part temperature 1, a rear part temperature 2, a molding cycle time, and a plurality of various data relating to molding conditions such as data relating to various resin materials R to be used, that is, various pellet materials Rp. The data relating to each pellet material Rp includes various physical properties of each pellet material Rp such as melting characteristics. In this manner, if the data relating to the pellet material Rp (resin material R) to be used in the molding condition data is included, Dm allows for the reflecting of the physical properties (melting characteristics, etc.) of each pellet material Rp in the calcutation of the estimated solid-phase rate Xcs which is described later, obtaining a more accurate estimated solid-phase rate Xcs.

Further, the screw data Ds includes various data relating to the form of the screw 3, specifically, data relating to various dimensions such as the outer diameter of the screw, the flight width of the screw, the friction coefficient between the solid and the screw, the depth of the screw groove, the length in the direction of the screw width, the screw lead, the flight coefficient, the torsion angle of the screw flight, the number of pitches, and a plurality of various data relating to the screw 3, such as data relating to the material type of the screw surface 3f. In particular, including data relating to the material type of the screw surface 3f allows for reflecting the deterioration factor due to the catalytic effect of the metal material of the screw surface 3f on the molten resin and the easiness of adhesion in the calcutation processing, enabling more accurate estimation of the molten state.

Providing the basic data input unit Fi with the function of inputting basic data Do including at least the molding condition data Dm relating to the molding conditions and the screw data Ds relating to the configuration of the screw 3 allows for collecting sufficient data to grasp the molten state of the molten resin in the heating cylinder 4, making it possible to reliably obtain accurately estimated solid-phase rates Xcs and estimated resin decomposition rates Xrs indicating the molten state of the required resin (molten resin).

On the other hand, the molding support device 1 includes a data processing unit F.

The data processing unit F includes an operational data setting unit Fs using an internal memory 10m, and the operational data setting unit Fs sets solid-phase rate operational data Dc, decomposition rate operational data Dr, and temperature increase operational data Dw. The Solid-phase rate operation expression data Dc is data relating to a calcutation formula for calculating the solid-phase rate Xc of the molten resin in the heating cylinder 4 based on the above-mentioned basic data Do; the Decomposition rate operation expression data Dr is data relating to a calcutation formula for calculating the resin decomposition rate Xr of the screw surface 3f during molding based on the above-mentioned basic data Do; the Increased temperature operation expression data Dw is data relating to a calcutation formula for calculating the temperature increase ΔTu based on data relating to the amount of shear heating E used for calcutation processing based on the Decomposition rate operation expression data Dr.

Next, the solid-phase rate calcutation formula for obtaining the solid-phase rate Xc, which is the basis of the Solid-phase rate operation expression data Dc, the decomposition rate calcutation formula for obtaining the resin decomposition rate Xr, which is the basis of the Decomposition rate operation expression data Dr, and the temperature increase calcutation formula for obtaining the temperature increase ΔTu, which is the basis of the Increased temperature operation expression data Dw will be described in detail.

Figure 4:
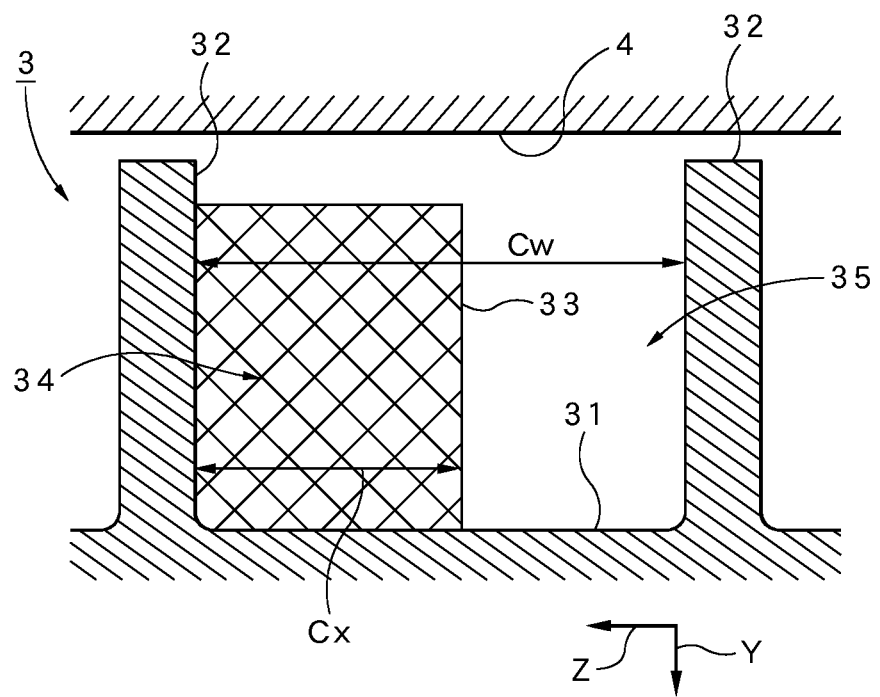
FIG. 4 is a principle diagram of a screw for explaining a calcutation function of a solid-phase rate calcutation processing function unit provided in the molding support device.

First, a solid-phase rate calcutation formula will be described. FIG. 4 shows the principle of screw 3 for explaining the calcutation function of the solid-phase rate Xc. In FIG. 4, reference numeral 3 denotes the screw, 4 denotes the heating cylinder, 31 denotes the screw groove bottom, 32 denotes the screw flight, 33 denotes the melt film, 34 denotes the solid bed, and 35 denotes the melt pool. Cx represents the width of the solid at the current position, and Cw represents the length obtained by subtracting the flight width from the pitch width.

[Formula 101] shows an example of the solid-phase rate calcutation formula used in the present embodiment.

$$\text{Solid-phase rate } Xc = Cx/Cw \quad \text{[formula 101]}$$
$$= (Cx'/Cw) \cdot (1 - ka \cdot \Phi I)$$
$$\text{Where } \Phi I = f(Tq, Tc) \cdot \Phi e$$

As shown in [formula 101], the solid-phase rate Xc can fundamentally be obtained by Cx/Cw. In [formula 101], Cx' represents the width of the solid piece one pitch earlier, ka denotes the adjustment coefficient, Φi represents a melting rate during injection, Φe denotes the melting rate during extrusion, Tq denotes the measuring time, and Tc represents the molding cycle time.

In general, in a melting mechanism including a continuously operating heating cylinder such as an extrusion molding machine, the known model formula proposed by Tadmor in 1978 is widely used as a theoretical formula for predicting the plasticization state.

On the other hand, since the injection molding machine M performs an intermittent operation (injection→metering-→standby), the injection molding machine M includes injection conditions such as injection positions and screw stop times different from those of the extrusion molding machine. Therefore, it is impossible to directly apply the known model formula to the injection molding machine M. Thus, the solid-phase rate calcutation formula used in this embodiment converts a model formula applicable to an extrusion molding machine to a model formula applicable to the injection molding machine M; specifically, a model formula applicable to the extrusion molding machine is utilized to the solid-phase rate calcutation formula with Φi obtained by multiplying a function formula including a measuring time Tr and a cycle time Tc by the rate Φe at which the resin material is molten (which is an amount suggesting the melting rate and has a dimensionless unit) like f (Tr, Tc)·Φe shown in [formula 101].

Thus, using the calcutation formula shown in [formula 101] converts the model formula applicable to the extrusion molding machine into the model formula applicable to the injection molding machine M, which enables obtaining the solid-phase rate Xc indicating the melting ratio (melting degree) of the molten resin in the heating cylinder 4 containing the screw 3. Therefore, the solid-phase rate Xc obtained by the solid-phase rate calcutation formula is useable as the estimated solid-phase rate Xc obtained based on the inputted basic data Do, that is, the estimated solid-phase rate Xcs.

Further, with respect to the estimated solid-phase rate Xcs, it is desirable to verify whether or not the estimated solid-phase rate Xcs matches the solid-phase rate of the actually obtained molten resin, that is, the actually measured solid-phase rate, and after adjustment, it is desirable to set a solid-phase rate calcutation formula that substantially matches the actually measured solid-phase rate as the Solid-phase rate operation expression data Dc in this embodiment.

The term (1−ka·Φi) in [formula 101] indicates that as the term approaches 0, that is, as the rate Φi increases, the solid-phase rate Xc approaches 0, suggesting that the molten resin in the heating cylinder 4 has completely melted. In the embodiment, how much unmelted solid remains is calculated from the solid-phase rate Xc to consider the correlation with the resin temperature change during molding. Although the thickness of the melt film 33 is generally used to calculate shear heat generation, there is a large difference between the measured value and the calculated value; however, in this embodiment, the solid-phase rate in the completely molten state (adjustment value) is specified to solve this; a solid-phase and a liquid phase are separately used, and the calcutation is performed based on the assumption that the shear heating is caused only in the liquid phase. The result showed substantial matching with the actual measurement value.

Figures 5, 6:
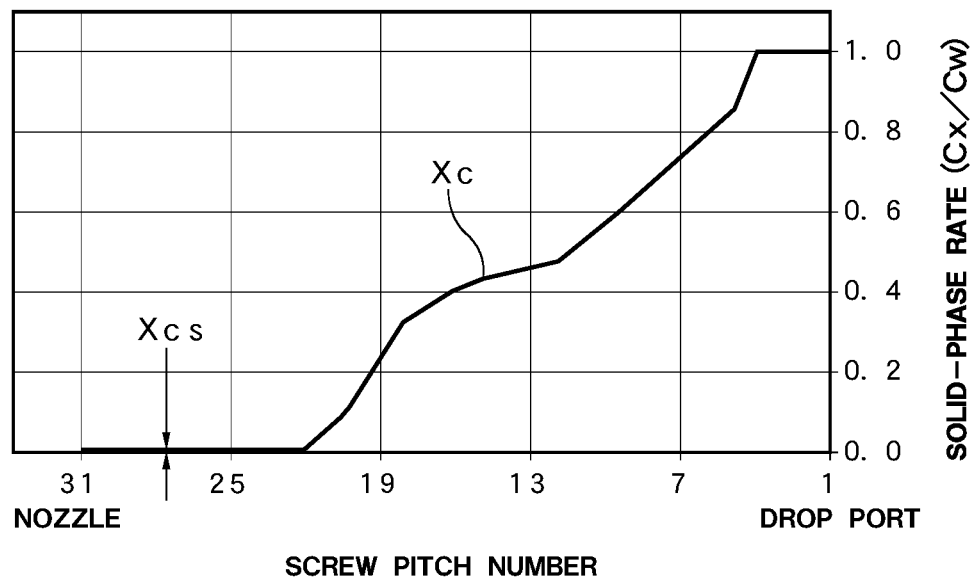
FIG. 5 is a characteristic diagram showing a change in solid-phase rate with respect to a position of a screw for explaining a calcutation function of a solid-phase rate calcutation processing function unit provided in the molding support device.
FIG. 6 is a list showing the easiness of adhesion of the resin to the metal serving as the basis of the resin decomposition rate by type.

FIG. 5 illustrates a change of the solid-phase rate Xc relative to the position of the screw 3 obtained from the solid-phase rate calcutation formula. In FIG. 5, the horizontal axis shows a screw pitch number, and the higher the number, the shorter the distance to the nozzle side. The vertical axis shows the solid-phase rate Xc, and the closer the solid-phase rate Xc to 0, the closer to a completely molten state, and the solid-phase rate Xc 0 shows a completely molten state. In FIG. 5, the solid-phase rate Xc at the position shown by Xcs is assumed to be the estimated solid-phase rate Xcs of the molten resin at the measurement completion.

The estimated solid-phase rate Xcs does not have to be 0 from a practical viewpoint. This criterion is desirably selected as "0.06," and this value was confirmed based on the experiment result. This can lead, when the estimated solid-phase rate Xcs is "Xcs≤0.06," to the judgment that the molten state is in a preferred state and, when "Xcs>0.06" is established, to the judgment that the melting is insufficient (insufficient plasticization). In this manner, the magnitude of the estimated solid-phase rate Xcs functions as an indicator showing the molten state of the insufficiently-plasticized molten resin, for example. The estimated solid-phase rate Xcs shows the melting level of the molten resin; thus, an un-melted polymer fraction may be used.

As described above, setting the Solid-phase rate operation expression data Dc for calculating the solid-phase rate Xc of the molten resin in the heating cylinder 4 based on the basic data Do in the Operation expression data setting unit Fs allows for obtaining the estimated solid-phase rate Xcs of the molten resin at the end of measurement by the calcutation processing based on the basic data Do and the Solid-phase rate operation expression data Dc by the solid-phase rate calcutation processing function unit Fcp to be described later; thus, the estimated solid-phase ratio Xcs obtained enables an accurate (quantitative) grasp of the insufficient plasticization of the resin, allowing appropriate measures against insufficient plasticization. Specifically, a personal judgment requiring experience, for example, is not required anymore to allow even a beginner operator having little experience to perform a more desirable molding (production) by increasing the yield rate and the molding quality of molded articles, for example. In addition, reflecting the physical properties (melting properties, etc.) of each pellet material Rp type in the calcutation of the estimated solid-phase rate Xcs allows for a more accurate estimation of the solid-phase rate Xcs.

Next, the decomposition rate calcutation formula will be described. [Formula 102] shows an example of the decomposition rate calcutation formula used in the present embodiment.

$$\text{Resin decomposition rate } Xr = E \cdot Wa \cdot kb \qquad \text{[formula 102]}$$

$$\text{Where } E = f(W, L, \sigma, \gamma, \zeta)$$

$$Wa \propto f(\Phi m, \Phi c, Qs)$$

[Formula 102] is fundamentally based on the model expression of Tadmor and is a calcutation formula for obtaining the resin decomposition rate Xr in the injection molding machine M. In [formula 102], E denotes the shearing heating value [MJ] calculated based on the Tadmor model formula, the total shear heating value obtained by integrating the shearing heating values in a range from a completely molten position to a tip end of the screw 3. Wa denotes the adhesion work [MJ/m$^2$] of the molten resin and metal, and kb shows the adjustment coefficient in consideration of the catalyst effect of the metal, respectively.

In the calcutation of the shearing heating value E, the reference numeral W denotes the length obtained by deducting a flight width from a pitch width, the reference numeral L denotes the screw spiral length, the reference numeral σ denotes shearing stress, the reference numeral γ denotes the shearing rate, and the reference numeral ζ denotes the dimensionless depth, respectively; in the calcutation of the adhesion work Wa, the reference numeral Φm denotes the work function of the base material metal, the reference numeral Φc denotes the work function of metal coated on the base material metal, and the reference numeral Qs denotes the oxygen content attached to the outermost surface metal, respectively. The oxygen content Qs is measurable by an X-ray analysis device (EDX device). This adhesion work Wa shows how easily the molten resin can adhere to metal; FIG. 6 shows how easily the molten resin can adhere to the metal of the screw surface 3f for the respective types.

Figures 7, 8:
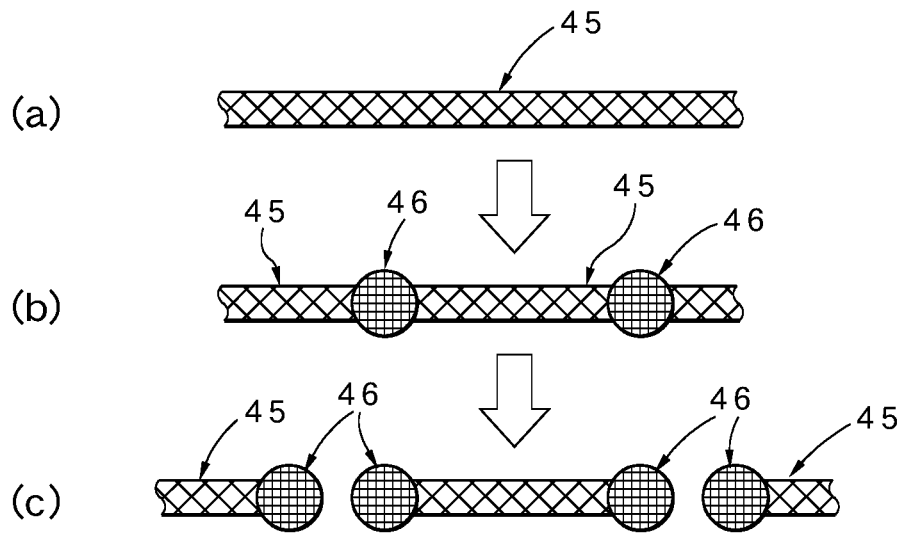
FIG. 7 is a diagram explaining the principle of degradation of resin as a basis of a resin decomposition rate calculated by a resin decomposition rate calculation processing function unit provided in the molding support device.
FIG. 8 is a list showing, by type, the ease with which the resin is decomposed relative to the metal on which the resin decomposition rate is based.

The metal catalyst effect (oxidation induction time) functions as a degradation factor in regard to the molten resin; thus, this catalyst effect is reflected in the coefficient kb. It is known that generally, when the polymer (resin) is heated, hydrogen is extracted to cause a polymer radical active species. In the polymer radical active species case, this state does not cause a reduced molecular weight of the polymer; however, contacting metal causes a catalyst action to bring about a radical coupling with oxygen in the air, leading to a phenomenon of promoting the decomposition of molten resin. FIGS. 7(a)-7(c) schematically show this phenomenon. FIG. 7(a) shows a state in which the polymer 45 is thermally activated (thermally decomposed). When a metal species causes catalyst activation in this state, an oxidization phenomenon occurs, as shown in FIG. 7(b), coupling the activated polymer 45 to oxygen 46. When the oxidization further proceeds, as shown in FIG. 7(c), a low-molecularization phenomenon occurs due to the oxidization decomposition of the polymer 45. FIG. 8 shows, according to type, how easily the molten resin is decomposed relative to the metal of the screw surface 3f.

The calcutation result of the resin decomposition rate Xr based on the decomposition rate calcutation formula of [formula 102] considers the retention time of molten resin, adhesion work, oxidation induction time, and screw shape, for example; thus, the resin decomposition rate Xr obtained by the decomposition rate calcutation formula is utilizable as the estimated resin decomposition rate Xr obtained based on the inputted basic data Do (that is, the estimated resin decomposition rate Xrs). Setting such a Decomposition rate operation expression data Dr simplifies the calcutation of the estimated resin decomposition rate Xrs by using the above-described basic data Do in use for the calcutation processing of the Solid-phase rate operation expression data Dc for the calcutation processing of the Decomposition rate operation expression data Dr, for example.

The experiment (demonstration) result confirmed no deterioration so long as the estimated resin decomposition rate Xrs of 0.00 was maintained. Thus, it is understood that when the estimated resin decomposition rate Xrs has a value higher than 0.00, the molten resin is in a deterioration state (including a case of a high risk of a shift to the deterioration state). Specifically, establishing "Xrs=0.00" for the estimated resin decomposition rate Xrs allows for the judgment of reaching a preferred molten state without deterioration, and establishing "Xrs>0.00" for the estimated resin decomposition rate Xrs leads to the judgment of reaching the deterioration state or a high risk of a shift to the deterioration state. As described above, the magnitude of the estimated resin decomposition rate Xrs is utilizable as an indicator showing the deterioration state of the molten resin caused by excessive plasticization.

As described above, setting the Decomposition rate operation expression data Dr for determining the resin decomposition rate Xr of the screw surface 3f during molding in the Operation expression data setting unit Fs based on the basic data Do allows for obtaining the estimated resin decomposition rate Xrs by performing the calcutation processing based on the basic data Do and the Decomposition rate operation expression data Dr by the decomposition rate calcutation processing function unit Fcr described later; therefore, using the basic data Do used for the calcutation processing of the Solid-phase rate operation expression data Dc and also for the calcutation processing of the Decomposition rate operation expression data Dr allows for obtaining the estimated resin decomposition rate Xrs.

The calcutation processing can easily provide the estimated resin decomposition rate Xrs, which allows an appropriate understanding of the molten resin's deterioration state; thus, the suitable range of the molten state can be set based on the limit point of both sides (the insufficient plasticization-side) of the molten state based on the estimated solid-phase rate Xcs and the limit point of the other side (the excessive plasticization-side) of the molten state based on the estimated resin decomposition rate Xrs, thus providing higher moldability and molding quality.

Next, the temperature increase calcutation formula will be described. An example of the temperature increase calcutation formula, which is the basis of the Increased temperature operation expression data Dw, is shown in [formula 103].

$$\text{Temperature increase } \Delta Tu = E/(Q \cdot Cm) \quad \text{[formula 103]}$$

In [formula 103], the shear heating value E in [formula 102] for obtaining the resin decomposition rate Xr described above can be used as E [MJ]. Q denotes the plasticizing capacity, and Cm denotes the melting specific heat (resin specific heat).

Using the data relating to the above-described shearing heat generation amount E provides the temperature increase $\Delta Tu$ in this manner, which facilitates obtaining the presumed temperature increase $\Delta Tus$. Dividing the shearing heating E from the completely melted position to the tip of the screw by the plasticizing capacity Q and the resin specific heat Cm provides the estimated temperature increase $\Delta Tus$. The molten resin was treated not as a Newtonian fluid such as water but as an index side fluid such as starch syrup.

The solid-phase rate Xc and the resin decomposition rate Xr are closely related to the temperature increase $\Delta Tu$ of the resin. Therefore, displaying the estimated temperature increase $\Delta Tus$ as information related to the molten state of the molten resin as information related to the estimated solid-phase rate Xcs and/or the estimated resin decomposition rate Xrs in addition to information related to the estimated solid-phase rate Xcs and/or the estimated resin decomposition rate Xrs allows for confirming the information related to the estimated temperature increase $\Delta Tus$ and enables the operator (user) to grasp the molten state more accurately.

Figures 9, 10:
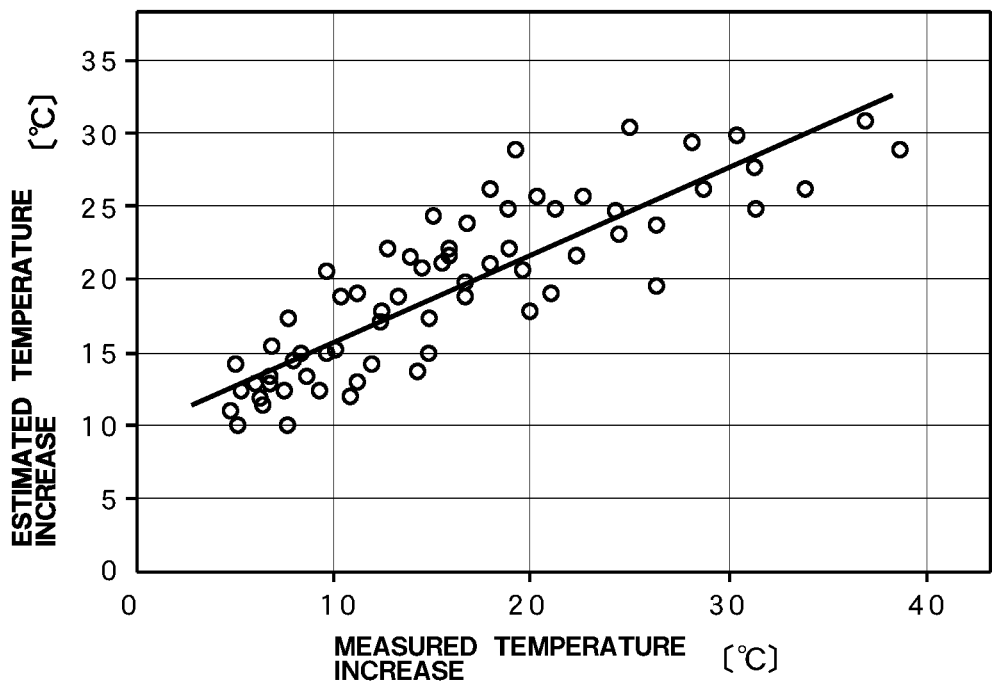
FIG. 9 is a correlation characteristic diagram showing a relationship between an estimated temperature increase and an actually measured temperature increase in the molding support device.
FIG. 10 is a functional description of a determination processing unit provided in the molding support device.

FIG. 9 shows the correlation characteristic between the estimated temperature increase $\Delta Tus$ and the measured temperature increase. This characteristic is obtained by using ABS resin as the resin; the estimated temperature increase $\Delta Tus$ is lower than the critical value p=0.01 in all cases, confirming a sufficient correlation.

On the other hand, the data processing unit F includes a calcutation processing function unit Fc using the molding machine controller 10 (control body 22 and internal memory 10m). The calcutation processing function unit Fc can perform calcutation processing using the Solid-phase rate operation expression data Dc, the Decomposition rate operation expression data Dr, and the Increased temperature operation expression data Dw.

Therefore, the calcutation processing function unit (Fc) includes at least a solid-phase rate calcutation processing function unit (Fcp) for calculating the solid-phase rate (Xc) of the molten resin at the end of the measurement, that is, the estimated solid-phase rate (Xcs), by the calcutation processing based on the basic data (Do) and the Solid-phase rate operation expression data (Dc), a decomposition rate calcutation processing function unit (Fcr) for calculating the resin decomposition rate (Xr) of the molten resin, that is, the estimated resin decomposition rate (Xrs), by the calcutation processing based on the basic data (Do) and the Decomposition rate operation expression data (Dr), and a temperature increase calcutation processing function unit (Fct) for calculating the estimated temperature increase ($\Delta Tus$) by the calcutation processing based on the Increased temperature operation expression data (Dw).

Further, the calcutation processing function unit Fc is provided with a determination processing unit Fcj which judges the degree of the estimated solid-phase rate Xcs and/or the estimated resin decomposition rate Xrs and outputs support message data Dh corresponding to the result of the determination processing. In this case, it is desirable to perform the determination processing on both the estimated solid-phase rate Xcs and the estimated resin decomposition rate Xrs; however, it is also possible to perform the determination processing on only one of the estimated solid-phase rate Xcs and the estimated resin decomposition rate Xrs as necessary.

FIG. 10 shows the determination criteria for the determination process. In FIG. 10, the determination result "01" is a case where "Xcs≤0.06" and "Xrs=0.00." In this case, since the molten state is in a sufficient state and the molten state is not in a deteriorated state, it can be determined that the molten state is in a good molding environment. The determination result "02" is a case where "Xcs≤0.06" and "Xrs>0.00." In this case, it can be determined that the molten state is in a sufficient state, but there is a possibility of a shift to the deterioration state. The determination result "03" is a case where "Xcs>0.06" and "Xrs=0.00." In this case, it can be judged that there is a possibility of insufficient plasticization and no deterioration state. The determination result "04" is a case where "Xcs>0.06" and "Xrs>0.00." In this case, it can be determined that there is a possibility of insufficient plasticization and, at the same time, a possibility of deterioration.

In addition, the determination processing unit Fcj has a function of outputting support message data Dh corresponding to the determination results "01" to "04." Specifically, when the determination result is "01," the support message mr is output; when the determination result is "02," the support message m1 is output; when the determination result is "03," the support message m2 is output; and when the determination result is "04," the support message m3 is output. The specific contents of the support message will be described in a molding support method using the molding support device 1 described later.

The molding support device 1 includes an output processing function unit Fd shown in FIG. 1. The output processing function unit Fd is a processing function for utilizing the output of the determination result and has a display function for displaying the support messages mr, m1, m2 ... on the display 7. The support messages mr, m1, m2, and m3 include determination messages mrj, m1j, m2j, and m3j indicating the result of the determination process, and countermeasure messages m1p, m2p, and m3p for performing the countermeasure (see FIGS. 17(a)-17(d)) corresponding to the determination messages m1j, m2j, and m3j. Therefore, the internal memory 10m stores support message data Dh corresponding to the support messages mr, m1, m2, and m3.

Although not shown in the figure, other processing functions using the determination result may be used for automatic correction processing in which data relating to the estimated solid-phase rate Xcs and data relating to the estimated resin decomposition rate Xrs are used as correction data corresponding to the countermeasure messages m1p, m2p ..., and corresponding molding conditions are automatically corrected.

Figure 11:
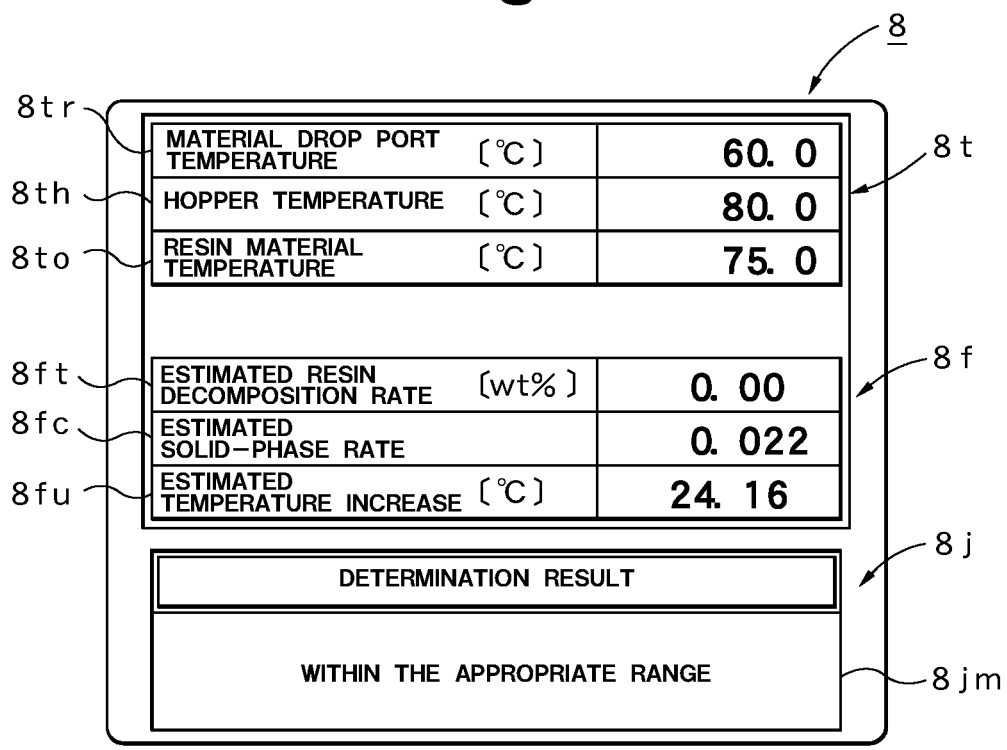
FIG. 11 is a screen view of a data display unit in the molding support device.

Further, the output processing function unit Fd is provided with a data display unit 8 shown in FIG. 11, and the data display unit 8 is provided with a control temperature display unit 8t, a resin state display unit 8f, and a determination result display unit 8j. In this case, a hopper temperature display unit (or a material temperature control unit temperature display unit) 8th, a material drop port temperature display unit 8tr, and a resin material temperature display unit 8to are provided in the control temperature display unit 8t; and an estimated resin decomposition rate display unit 8fp, an estimated solid-phase rate display unit 8fc, and an estimated temperature increase display unit 8fu are provided in the resin state display unit 8f. Each physical quantity is numerically displayed on each of these display units. A message display unit 8 jm is provided in the determination result display unit 8j.

The above is the basic function of the molding support device 1. The basic function is to maintain the molten state of the resin in the heating cylinder 4 in an optimum state; however, the state (temperature control state) of the pellet material Rp supplied to the heating cylinder 4 is closely related to the molten state of the resin in the heating cylinder 4.

Therefore, in the molding support device 1 according to the present embodiment, the temperature control state of the pellet material Rp is optimized from the viewpoint of further optimizing such basic functions as the configuration of the main part; the configuration of the main part will be specifically described below.

First, as shown in FIG. 1, the molding condition data Dm input by the basic data input unit Fi includes data Dmc related to the molding cycle time Tc as data of interest. Further, a resin selection unit (selection list) Dms capable of inputting the type of the pellet material Rp ... (resin material R ... ) and a control temperature input unit Dint capable of inputting the temperature (control temperature) of the temperature control unit 6 are provided. In this case, the control temperature input unit Dmt assumes manual input. In the present embodiment, the control temperature Tr is automatically set when the resin is selected by the resin selection unit Dms; however, it is also possible to arbitrarily input the control temperature Tr by manual operation. In particular, in the case where the upper limit value Tru and the lower limit value Trm are set and controlled in controlling the control temperature Tr, the upper limit value Tru can be automatically set according to the type of the pellet material Rp ... (resin material R ... ) selected by the resin selection unit (selection list) Dms, and the lower limit value Trm can be set to manual operation. Further, in this case, both the upper limit value Tru and the lower limit value Trm can be set to manual operation. Therefore, the basic data input unit Fi is provided with a control temperature manual input function capable of manually inputting a lower limit value Trm of the control temperature Tr (upper limit value Tru if necessary).

Further, a Controlled temperature data table DT is provided in the internal memory 10m, and a temperature setting processing unit Fcs is provided as the calcutation processing function unit Fc. In the Controlled temperature data table DT, the optimum control temperature Tr by the temperature control unit 6 is set for each resin type. In this case, the control temperature Tr itself may be directly set as the control temperature Tr, or as described above, the upper limit value Tru and the lower limit value Tru may be selected as the control range of the control temperature Tr, the upper limit value Tru may be set in the Controlled temperature data table DT, and the lower limit value Trm may be set by the control temperature manual input function in the basic data input unit Fi described above.

In this way, setting the upper limit value Tru of the control temperature Tr in the Controlled temperature data table DT enables automatic control of the control temperature Tr by setting the upper limit value Tru and the lower limit value Trm; therefore, this approach allows accurate control of the control temperature (target temperature), even when various control methods are adopted, and providing the basic data input unit Fi with a control temperature manual input function that allows for the manual input of at least the lower limit value Trm of the control temperature Tr enables arbitrary setting by manual inputting the lower limit value Trm in the case of automatic setting the upper limit value Tru, and if necessary, facilitates the manual setting of the entire control temperature Tr (upper limit value Tru and lower limit value Trm).

Further, the temperature setting processing unit Fcs has a function of reading out the control temperature Tr (or the upper limit value Tru) corresponding to resin type input from the Controlled temperature data table DT when resin type is input (selected) from the basic data input unit Fi when setting the molding conditions described later, thereby setting the control temperature Tr of the temperature control unit 6. As described above, the control temperature Tr includes at least one or both of the control temperature Trh by the heater 6h attached to the hopper 5h, the control temperature by the material temperature control unit 6p of the material supply device Prm, and the control temperature Trd by the water jacket 6j attached to the material drop port 5d.

Next, the Controlled temperature data table DT and the temperature setting processing unit Fcs will be specifically described with reference to FIGS. 1-3, 12, and 15(a)-15(d).

In the known model formula proposed by Tadmor above, there is a term relating to the resin material temperature Tro of the resin material R, that is, the commonly used pellet material Rp, as shown in [formula 104].

[Equation 1]

$$\delta = \left\{ \frac{(2 \cdot km(Tb - Tmo) + Va) \cdot X}{Vbx \cdot Vb \cdot \rho m(Cs(Tmo - Tro) + \lambda)} \right\}^{\frac{1}{2}} \qquad \text{[formula 104]}$$

Where δ is the thickness of the melt film, km is the thermal conductivity of the melt, Tb is the temperature of the heating cylinder, Tmo is the melting point, Tro is the temperature of the resin material, Va and Vb are the coefficients indicating the melting speed, X is the width of the solid bed, Vbx is the circumferential velocity component of the cylinder in the direction of the screw width, Cs is the specific heat of the solid, ρ m is the density of the liquid, and λ is the latent heat of melting.

Therefore, reflecting the information related to the temperature control of the temperature control unit 6 in the injection molding machine M in the model formula for predicting the plasticization state in the injection molding machine M enables a more realistic simulation of molten state.

Therefore, first, the present embodiment verified the correlation between the measured temperature (resin material temperature Tro) of the pellet material Rp at the central position of the material drop port 5d shown in FIG. 2 and the estimated temperature at the center of the pellet material Rp. In this case, the temperature was measured by placing a thermocouple at the center of the material drop port 5d. On the other hand, the calcutation formula [formula 105] yielded the estimated value.

$$Tro(x, t) = f(Trx, Try, X, \alpha, Tc) \qquad \text{[formula 105]}$$

Where Tro (x, t) is the temperature of the pellet material Rp, taking into account the molding cycle time Tc, that is, the estimated resin material temperature, and corresponds to Tro in [Formula 104]. Where Trx is the temperature when one side of the cylindrical pellet material Rp shown in FIG. 3 is in contact with the boundary between the material dropping port 5d and the hopper 5h (or the material supply device Prm), Try is the temperature when the opposite side is in contact with the heating cylinder 4 near the inlet 3i of the screw 3 for the molding cycle time Tc, and $\alpha$ is the eigenvalue of the resin material obtained by dividing the thermal conductivity kn of the pellet material Rp by the heat capacity.

Figure 12:
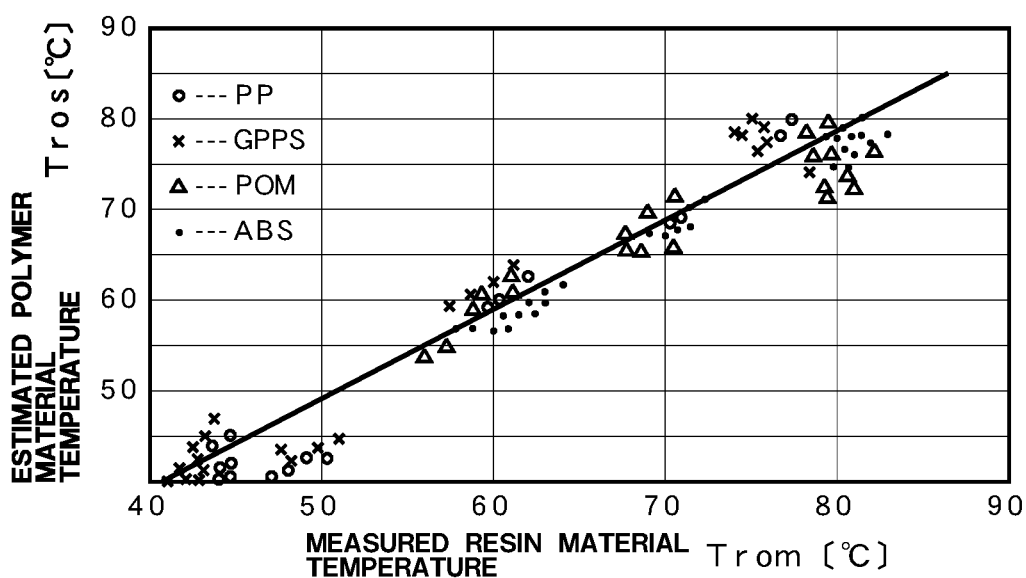
FIG. 12 is a correlation characteristic diagram showing a relationship between an actually measured resin material temperature and an estimated resin material temperature using a type of resin as a parameter to explain the effectiveness of the molding support device.

Then, the test conditions (molding conditions) were made different for each resin type; the resin material temperature Tro was estimated from [formula 105], and the temperature of the pellet material Rp at the center of the material drop port 5d shown in FIG. 2 was measured. This correlation graph is shown in FIG. 12. In the embodiment, the four resin types, "PP (polypropylene)," "GPPS (general-purpose polystyrene)," "POM (polyacetal)," and "ABS (acrylonitrile butadiene styrene)" were used.

As is clear from FIG. 12, the estimated resin material temperature Tros and the measured resin material temperature Tram around 80° C. are more scattered than other temperatures, but the overall correlation coefficient between the measured value and the estimated value is 0.98. That is, the graph is generally a 1:1 graph rising steadily from left to right, verifying the validity of [formula 105]. Therefore, it is possible to estimate the temperature of the pellet material Rp by the control temperature Trd of the material drop port 5d and the control temperature Trh of the hopper 5h (or the control temperature of the material supply device Prm), and further by [formula 105] depending on the molding conditions and the physical properties of the resin.

Figure 13:
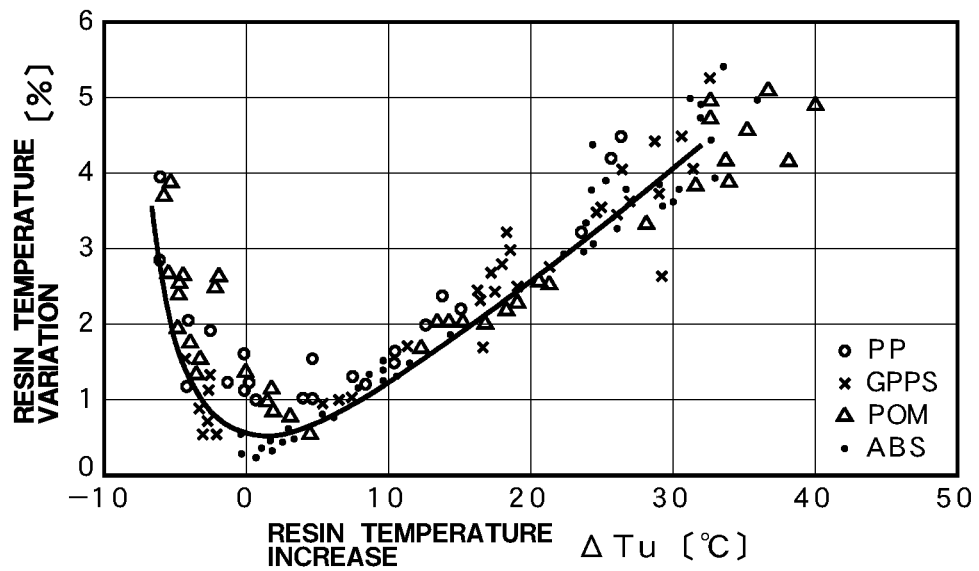
FIG. 13 is a characteristic diagram showing a relationship between variations in resin temperature and temperature increase of resin for explaining the effectiveness of the molding support device.

In addition, the temperature stability of the pellet material Rp with temperature change was evaluated. FIG. 13 is a graph showing variations [%] in the resin temperature with respect to the temperature increase $\Delta$Tu [° C.] of the resin in the heating cylinder 4. FIG. 13 clearly shows a V-shaped curve graph indicating that the resin temperature dispersion becomes minimal as the temperature increase $\Delta$Tu approaches 0. Further, as the temperature increase $\Delta$Tu becomes larger on the negative side, the unmelted resin increases, and as the temperature increase $\Delta$Tu becomes larger on the positive side, the carbide increases.

Therefore, as the number of unstable elements increases, the variation in the resin temperature increases; therefore, in order to reduce the variation, it is understood that the conditions for obtaining the optimum molten state are such that the temperature increases $\Delta$Tu of the unmelted resin, the carbide, and the resin are close to 0. That is, since the estimated solid-phase rate Xcs, the estimated resin decomposition rate Xrs, and the estimated temperature increase $\Delta$Tus described above can be obtained by estimation, a dimensionless function f (Xcs, Xrs, $\Delta$Tus) was created as an index resin temperature stability by calcutation, and the correlation with the variation [%] (measured value) of the resin temperature was examined.

Figure 14:
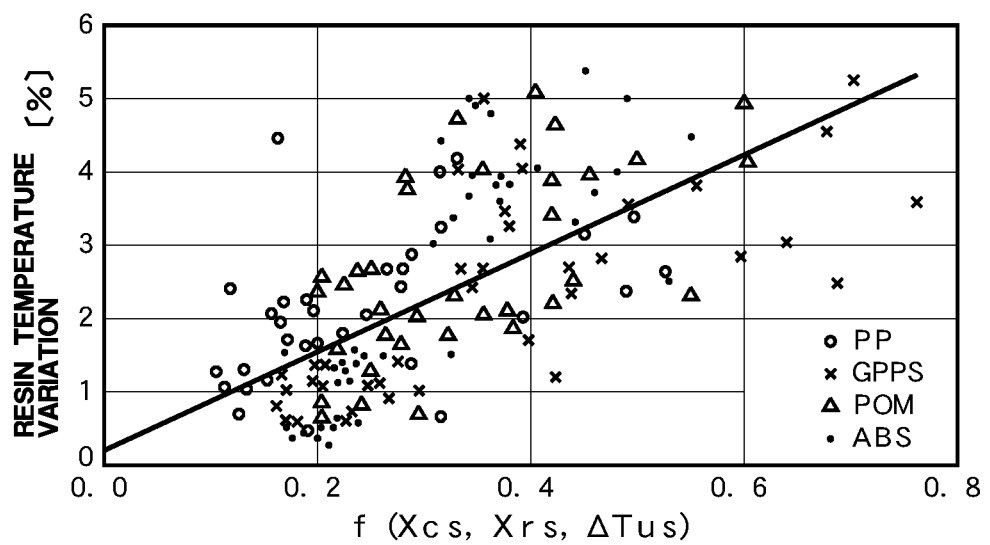
FIG. 14 is a characteristic diagram showing a relationship between variations in resin temperature with respect to an index showing resin temperature stability for explaining the effectiveness of the molding support device.
Figure 15A:
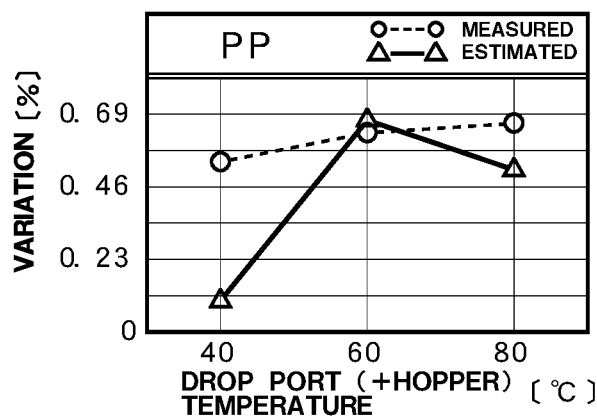
FIG. 15*a* is a characteristic diagram showing the relationship between the resin material temperature variation and the control temperature, which is the verification result of the resin (PP) that is the basis of the Controlled temperature data table provided in the molding support device.
Figure 15B:
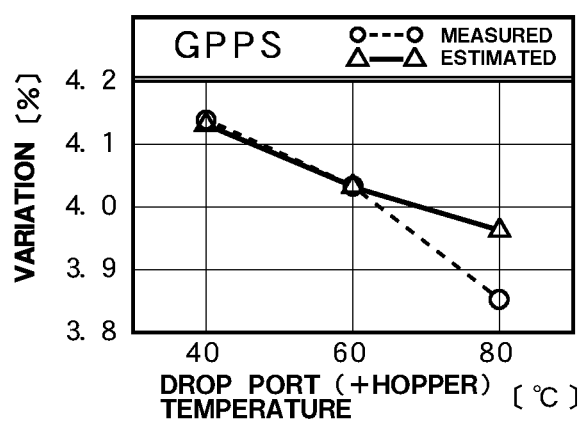
FIG. 15*b* is a characteristic diagram showing the relationship between the resin material temperature variation and the control temperature, which is the verification result of the resin (GPPS) that is the basis of the Controlled temperature data table provided in the molding support device.
Figure 15C:
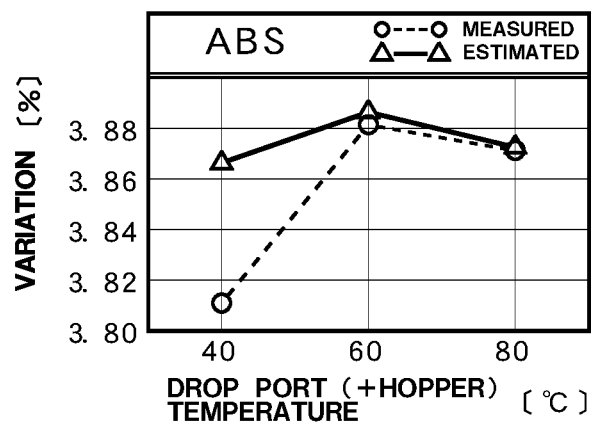
FIG. 15*c* is a characteristic diagram showing the relationship between the control temperature and the resin material temperature variation, which is the verification result of the resin (ABS) that is the basis of the Controlled temperature data table provided in the molding support device.
Figure 15D:
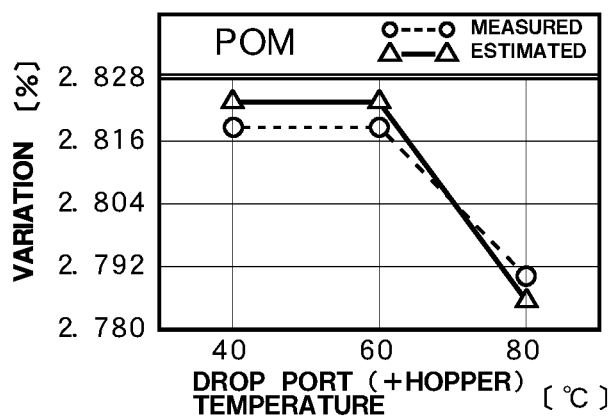
FIG. 15*d* is a characteristic diagram showing the relationship between the control temperature and the resin material temperature variation, which is the verification result of the resin (POM) that is the basis of the Controlled temperature data table provided in the molding support device.

FIG. 14 shows the correlation graph between f (Xcs, Xrs, $\Delta$Tus) and variations in resin temperature. The correlation graph shown in FIG. 14 indicates the correlation coefficient between the value calculated from f (Xcs, Xrs, $\Delta$Tus) and the variation in the resin temperature is 0.67 (p=2.37E–24). Therefore, it is presumed that it is possible to predict variations in resin temperature by calcutation.

Therefore, the temperature of the hopper 5h (or the material supply device Prm) and the material dropping port 5d, that is, the control temperatures Trh and/or Trd, are set as the molding conditions; the control temperatures (Trh, Trd) are changed to 40 [° C.], 60 [° C.], 80 [° C.], thereby measuring the variation of the resin temperature, and for f (Xcs, Xrs, $\Delta$Tus), the variation in resin temperature is calculated by making it possible to input the control temperature (Th, Trd) of the hopper 5h (or material supply device Prm) and the material drop port 5d as molding conditions.

FIGS. 15(a)-15(d) show the results for each pellet material Rp type. FIG. 15 (a) shows a case using "PP" as the pellet material Rp and changing the temperature on the condition that the control temperature Trd of the material drop port 5d and the control temperature Trh of the hopper 5h (or the material supply device Prm) are the same; FIG. 15 (b) shows a case using "GPPS" as the pellet material Rp and changing the temperature on the condition that the control temperature Trd of the material drop port 5d and the control temperature Trh of the hopper 5h (or the material supply device Prm) are the same; FIG. 15 (c) shows a case using "ABS" as the pellet material Rp and changing the control temperature Trd of the material drop port 5d, and in contrast, the control temperature Trh of the hopper 5h (or the material supply device Prm) is constant at 80° C.; FIG. 15 (d) shows a case using "POM" as the pellet material Rp and changing the control temperature Trd of the material drop port 5d, and in contrast, the control temperature Trh of the hopper 5h (or the material supply device Prm) is constant at 80° C.

As is clear from FIGS. 15(a)-15(d), in the case of "PP," as the control temperature Tr (Trd, Trh) in the material drop port 5d and the hopper 5h (or the material supply device Prm) increases, the variation in the resin temperature increases, but the variation in the resin temperature at 60° C. is the largest in the calcutation. Regarding "GPPS," "ABS," and "POM," the calculated and measured values almost coincide. Therefore, it has been confirmed that the control temperature Tr (Trd, Trh) can be calculated and that the appropriate control temperature Tr (Trd, Trh), and that the combination of the control temperature Trd and Trh of the material drop port and the hopper 5h (or the material supply device Prm) can be combined for each resin type.

In the molding support device 1 according to the present embodiment, when setting the appropriate control temperatures Trd and Trh for each resin type by the Controlled temperature data table DT and selecting (inputting) the resin type, the temperature setting processing unit Fcs can automatically set the appropriate control temperatures Trd and Trh of the material drop port 5d, and the hopper 5h (or the material supply apparatus Prm).

Further, the output processing function unit Fd has at least a function of displaying the control temperature Tr (Trd, Trh) on the display 7. FIG. 11 shows the control temperature display unit 8t based on this function. Further, the data processing unit (F) is provided with a resin temperature processing function for determining the resin material temperature (Tro) by calcutation processing based on the resin temperature calcutation formula data while setting the resin temperature calcutation formula data for converting the control temperature (Tr (Trd, Trh)) into the temperature of the pellet material Rp (resin material temperature (Tro)) based on at least some of the shape data (Dmp) and the molding cycle time data (Dmc) of the resin material (R) in the molding condition data (Dm). Thus, estimating the resin material temperature Tro based on the obtained control temperature Tr allows for accurately grasping information relating to the temperature state of the resin material temperature Tro itself and the melting state of the resin based on the temperature state, that is, the relationship between the estimated solid-phase rate Xcs and/or the estimated resin decomposition rate Xrs and the estimated temperature increase ΔTus.

The output processing function unit Fd is provided with a resin material temperature display unit 8to for displaying on the display 7 the resin material temperature Tro obtained by the resin temperature conversion processing function in the data processing unit F and displays the resin material temperature Tro obtained by the resin material temperature display unit 8to. As a result, visual observation can easily confirm the resin material temperature Tro, and it is also easy to confirm the information in comparison with other information, that is, the estimated solid-phase rate Xcs and/or the estimated resin decomposition rate Xrs and the estimated temperature increase ΔTus.

Figure 16:
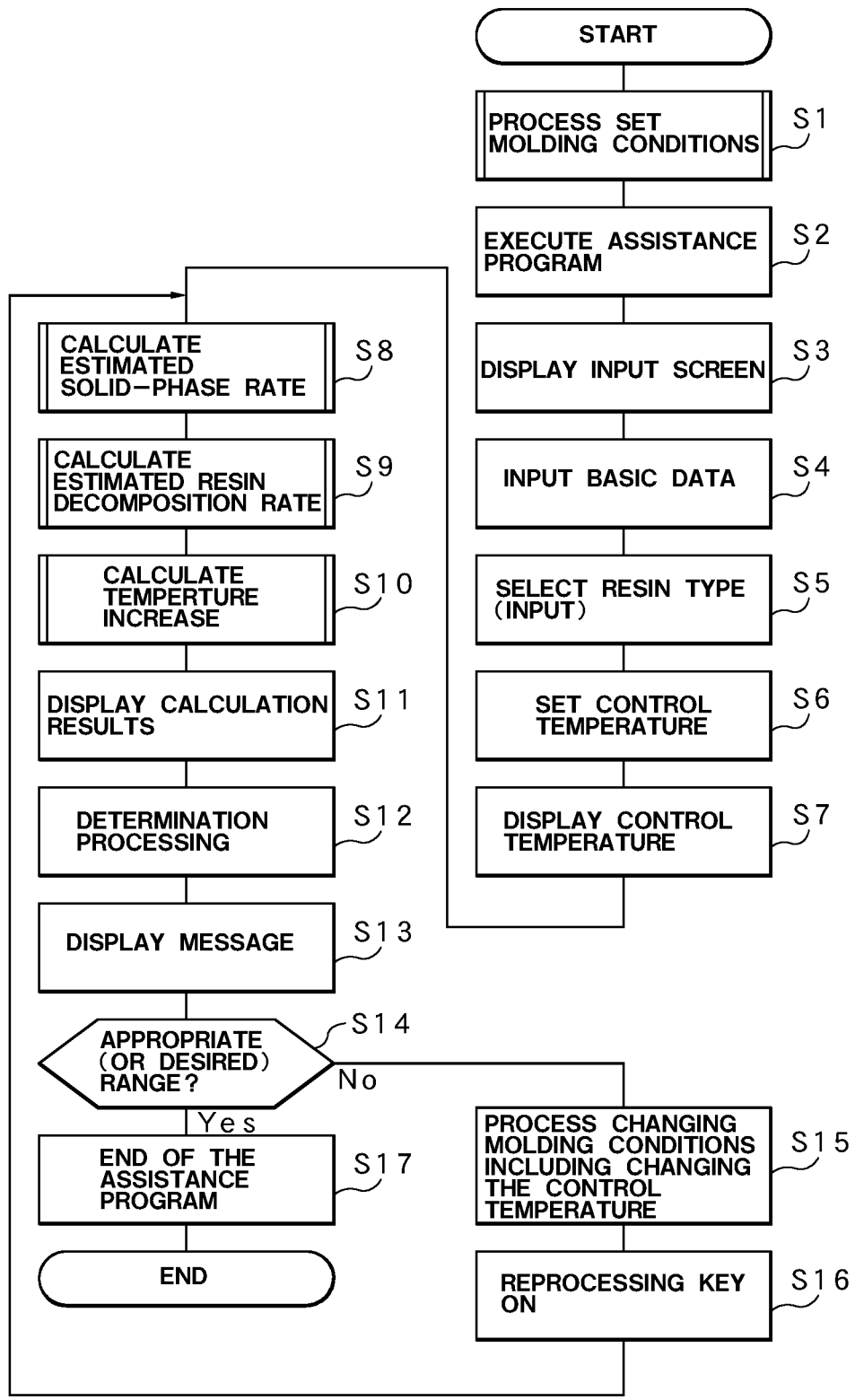
FIG. 16 is a flowchart showing a processing procedure of molding support using the molding support device.

Next, the molding support method using the molding support device 1 according to the present embodiment will be described with reference to the flowcharts in FIG. 16 while referring to each drawing.

The molding support device 1 can fundamentally be used when setting the molding conditions before production starts.
The Assistance program Ps stored in the internal memory 10m executes the molding support process operation.

First, the operator performs processing for setting the molding conditions in the injection molding machine M following a normal setting procedure (step S1). In this case, in setting the molding conditions, information relating to ordinary molding conditions, that is, various ordinary information (conditions) for operating the injection molding machine M, is set.

On the other hand, when the processing for setting the molding conditions is complete and the molding support device 1 according to the present embodiment is to be used, a predetermined support start key (not shown) is turned ON, and the molding support device 1 is turned ON to execute the Assistance program Ps (step S2). As a result, the display 7 displays an input screen (not shown) (step S3).

With the touch panel 7t (basic data input unit Fi) corresponding to the displayed input screen, the above-described basic data Do including the molding condition data Dm relating to the preset molding conditions and the screw data Ds relating to the configuration of the screw 3 is input (step S4). Specifically, it can be performed by direct numerical input or selection input from a window display. In particular, the resin type used in connection with the present embodiment is selected from the resin list of the resin selection unit Dms (step S5). Thus, the control temperatures Trd and Trh corresponding to the selected resin are read from the Controlled temperature data table DT and are set in the temperature setting processing unit Fcs as the control temperature Tr (Trd and Trh) of the temperature control unit 6 (step S6). Further, it is displayed on the control temperature display unit 8t shown in FIG. 11 (step S7). In this case, if the data related to the molding conditions, the screw, etc. have already been registered, the input at this time is unnecessary. When the input processing of the basic data Do is complete, it is checked whether there is any erroneous input or input omission of the data, and a confirmation key (not shown) is turned ON.

As a result, the solid-phase rate calcutation processing function unit Fcp performs calcutation processing based on the inputted basic data Do and Solid-phase rate operation expression data Dc (step S8). Since the estimated solid-phase rate Xcs based on the basic data Do is calculated by calcutation processing, the obtained estimated solid-phase rate Xcs is registered at least temporarily in the internal memory 10m. Further, the decomposition rate calcutation processing function unit Fcr performs calcutation processing based on the inputted basic data Do and Decomposition rate operation expression data Dr (step S9). Since this calcutation processing calculates the estimated resin decomposition rate Xrs based on the basic data Do, the obtained estimated resin decomposition rate Xrs is registered at least temporarily in the internal memory 10m. Further, the temperature increase calcutation processing function unit Fct performs calcutation processing based on the Increased temperature operation expression data Dw (step S10). Since this calcutation processing calculates the estimated temperature increase ΔTus, the obtained estimated temperature increase ΔTus is registered at least temporarily in the internal memory 10m. Then, the resin state display unit 8f shown in FIG. 11 displays the estimated solid-phase rate Xcs, estimated resin decomposition rate Xrs, and the estimated temperature increase ΔTus (step S11) obtained. As described above, in addition to the information relating to the estimated solid-phase rate Xcs and the estimated resin decomposition rate Xrs, the information relating to the estimated temperature increase ΔTus is also displayed; thus, the information relating to the estimated temperature increase ΔTus can also be checked. Therefore, the operator can more accurately grasp the molten state of the resin.

Suppose the estimated solid-phase rate Xcs and the estimated resin decomposition rate Xrs are obtained. In this case, the determination processing unit Fcj judges the degree of the estimated solid-phase rate Xcs and the estimated resin decomposition rate Xrs according to the determination criteria shown in FIG. 10 (step S12). Based on the result of the determination processing, the support messages mr, m1, m2, and m3 shown in FIG. 10 corresponding to the result are selected, and the support message data Dh corresponding to the selected support messages mr . . . are output; accordingly, the output processing function unit Fd displays the support messages mr, m1, m2, or m3 shown in FIGS. 17(a)-17(d) selected based on the support message data Dh output from the determination processing unit Fcj on the message display unit 8j (step S13).

FIGS. 17(a)-17(d) show examples of support messages mr, m1, m2 . . . in the message display unit 8j. In the example, the determination messages m1j, m2j . . . indicating the result of the determination process are displayed in the upper part, and the countermeasure messages m1p, m2p . . . for performing the countermeasure corresponding to the determination messages m1j, m2j . . . are displayed in the lower part, as necessary.

Figure 17A:
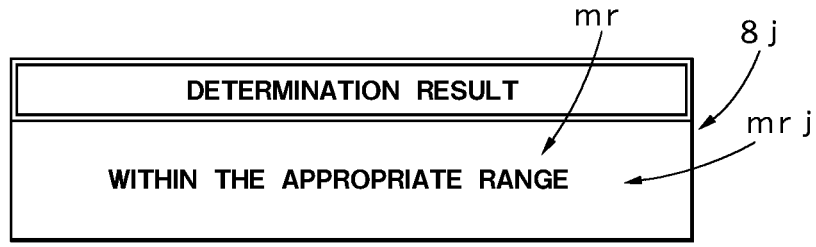
FIG. 17*a* is a display screen showing an example of a determination message displayed by an output processing function unit provided in the molding support device.

Specifically, in the case of the support message mr, as shown in FIG. 17(a), for example, the characters "proper range" are displayed as the determination message mrj.

Figure 17B:
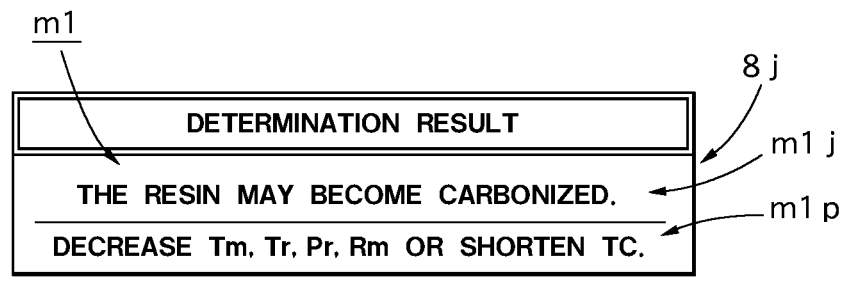
FIG. 17*b* is another display screen showing an example of a determination message displayed by an output processing function unit provided in the molding support device.
Figure 17C:
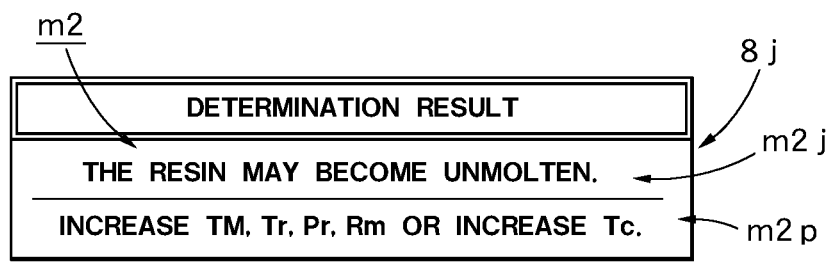
FIG. 17*c* is another display screen diagram showing an example of a determination message displayed by an output processing function unit provided in the molding support device.
Figure 17D:
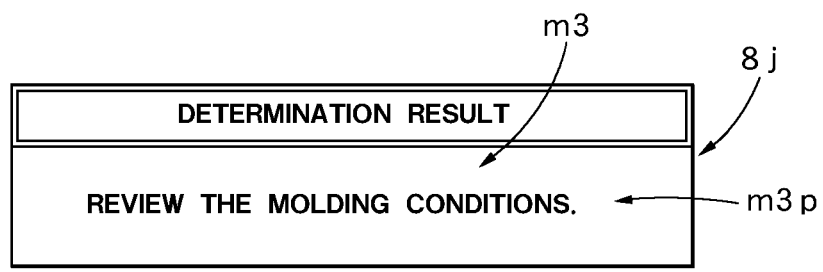
FIG. 17*d* is another display screen diagram showing an example of a determination message displayed by an output processing function unit provided in the molding support device.

In the example, although the countermeasure message is not displayed, a necessary countermeasure message even if the message is within an appropriate range, that is, a message for further improvement by changing, can be displayed as necessary. Further, in the case of the support message m1, as shown in FIG. 17(b), for example, the characters "There is a possibility of carbonization of the resin" are displayed as the determination message m1j, and for example, the characters "Decrease Tm, Tr, Pr, Rm or shorten Tc" are displayed as the countermeasure message m1p (Tm: set temperature for heating, Tr: control temperature, Pr: backpressure, Rm: rotational speed, Tc: molding cycle time). Similarly, in the case of the support message m2, as shown in FIG. 17(c), for example, the characters "There is a possibility of generating unmelted resin" are displayed as the determination message m2j, and for example, the characters "Increase Tm, Tr, Pr, Rm or Increase Tc" are displayed as the countermeasure message m2p. Further, in the case of the support message m3, as shown in FIG. 17(d), for example, "Please review the molding conditions" is displayed as the countermeasure message m3p to urge a so-called total resetting of the molding conditions. In the example, the determination messages are not individually displayed, but the determination messages are substantially included in the countermeasure message m3p.

As described above, providing the calcutation processing function unit Fc with the determination processing unit Fcj for judging the degree of the estimated solid-phase rate Xcs and/or the estimated resin decomposition rate Xrs and outputting the support message data Dh corresponding to the result of the determination processing, and providing the output processing unit Fd with the function for displaying the support messages mr, m1, m2 . . . based on the support message data Dh outputted from the determination processing unit Fcj in the message display unit 8j of the display 7 facilitate the operator to grasp the molten state of the resin difficult to judge and to perform the necessary countermeasure processing quickly.

In particular, including the determination messages mrj, m1j, m2j . . . indicating the result of the determination of the determination processing and the countermeasure messages m1p, m2p . . . for taking the countermeasure corresponding to the determination messages m1j, m2j . . . in the support messages mr, m1, m2 . . . enables confirming the result of the determination processing by visual means; thus, even an inexperienced beginner operator can easily and surely confirm whether or not the molten state of the resin is appropriate and can quickly take necessary measures such as changing the setting of molding conditions and improving the effectiveness and efficiency of manufacturing the mold products.

As a result, displaying the support messages m1, m2, or m3 other than the proper message mr on the message display unit 8j performs processing for changing the molding conditions according to the displayed support messages m1, m2, or m3, that is, the determination messages m1j . . . and the countermeasure messages m1p . . . (steps S14 and S15). For example, suppose the support message m2 (determination message m2j, countermeasure message m2p) is displayed. In this case, the setting may be changed to increase one or more of the set temperature Tm, the backpressure Pr, and the rotational speed Rm and the setting may be changed to increase the molding cycle time Tc in accordance with "Unmelted resin may be produced" (determination message m2j) and "Increase Tm, Tr, Pr, and Rm or increase Tc" (countermeasure message m2p).

In this case, the degree of change can be determined by the operator. In this case, if the estimated solid-phase rate Xcs and the estimated resin decomposition rate Xrs are visually displayed by numerical display or graphic display, etc. as described above, the operator can confirm the degree of deviation from the proper range; accordingly, the operator can determine the degree of change of the molding conditions.

In particular, the control temperature Tr (Trd, Trh) may be included in the modification of the molding conditions. Therefore, when it is difficult to change the heating temperature of heating cylinder 4 or the molding cycle time due to the molding environment or various conditions, the control temperature Tr (Trd, Trh) is changeable. In this case, it is possible to use the control temperature input unit Dint which allows arbitrary input by manual operation in the basic data input unit Fi shown in FIG. 1. The display of the temperature-adjusting temperature display unit 8t reflects the change in this case. Further, confirming the display of the resin state display unit 8f and the determination result display unit 8j enables determining the degree of change, etc.

As described above, in the present embodiment, since the control temperature Tr (Trd, Trh) is changeable, it becomes a useful adjusting means (setting changing means) when it is difficult to change the heating temperature of the heating cylinder 4 or the molding cycle time.

Completing the processing for changing the molding conditions and turning a re-processing key (not shown) ON enable performing the re-calculation processing of the estimated solid-phase rate Xcs and the estimated resin decomposition rate Xrs, and performing re-determination processing (steps S16, S8 . . . ).

On the other hand, displaying the proper message mr on the message display unit 8j in step S14 allows for confirming that the melted state is in a sufficient state, and that the deteriorated state is not present so that the molding environment is good. Therefore, since it is possible to shift to the next stage, an end key (not shown) is turned on to end the Assistance program execution (steps S14 and S17). Thus, the use of the molding support device 1 can be terminated.

As described above, according to the molding support device of the present embodiment, a Controlled temperature data table DT is provided in which the optimum control temperature Tr by the temperature control unit 6 for controlling the temperature of the material supply unit 5 for supplying the resinous material R to the inside of the heating cylinder 4 is set for each type of the resins, and a temperature setting processing unit Fcs is provided in which the control temperature Tr is set as the control temperature Tr of the temperature control unit 6 by reading out the control temperature Tr corresponding to the type of the resins input from the Controlled temperature data table DT if the type of the resins is input from the basic data input unit Fi when setting the few molding conditions, which, in particular, allows for setting the optimum (accurate) Controlled temperature Tr that matches the resin type, which further improves the efficiency and stabilization of the entire process in the heating cylinder 4. In addition, displaying the control temperature Tr in the temperature control unit 6 on the display 7 at least allows the operator to check the control temperature Tr and change (adjust) the control temperature Tr using a support function such as changing the molding conditions in the molding support device 1 or arbitrarily by the manual from the viewpoint of further enhancing the plasticization quality. Thus, adding the control temperature Tr to the molding conditions to be changed widens the range of adjustment of the entire molding conditions, thereby ensuring high molding quality by further improving the plasticization quality.

The present invention is not limited to the above in detail and is not limited to such an embodiment; the present invention can be arbitrarily changed, added, or deleted in the detailed configuration, shape, material, material, quantity, numerical value, technique, etc., without departing from the gist of the present invention.

For example, although an example in which the pellet material Rp is applied to the resin material R is not limited to the pellet material Rp, such as a resin material similar to the pellet material Rp. Although the molding condition data Dm and the screw data Ds are exemplified as the basic data Do, it is possible to include other data or a part of the exemplified data. Further, although the touch panel $7t$ of the display 7 is exemplified as the basic data input unit Fi, various input means can be applied as the basic data input unit Fi, for example, when data in external memory for storing the basic data Do is transferred or transmitted by a communication means, or when all data are registered in the internal memory $10m$ in advance and the basic data Do is selected from all data. On the other hand, the Solid-phase rate operation expression data Dc and the Decomposition rate operation expression data Dr are examples, and the other calcutation formula data for obtaining the solid-phase rate Xc and the resin decomposition rate Xr are not excluded.

INDUSTRIAL APPLICABILITY

The molding support device according to the present invention can be utilized in various injection molding machines for injecting and filling a metal mold with a plasticized molten resin by a screw and molding the resin.

The invention claimed is:

1. A molding support device for an injection molding machine which injects and fills a metal mold with a plasticized molten resin by a screw and molds the molten resin, comprising:
    a controller configured to control the temperature of a material supplier which supplies a resin material to an inside of a heating cylinder;
    a basic data input unit which can input at least a resin material type;
    a Controlled temperature data table in which an optimum control temperature by a temperature control unit is set for each resin material type; and
    a data processing unit associated with the controller having a temperature setting processing unit which reads the optimum control temperature corresponding to the resin material type input from the basic data input unit at least when molding conditions are set, thereby setting a control temperature of the temperature control unit,
    wherein the controller has an output processing function unit which displays the control temperature on a display, and
    wherein an upper limit value of the optimum control temperature is set in the Controlled temperature data table associated with the controller, and
    wherein the controller is further configured to control the temperature control unit to maintain the molten state of the resin in the heating cylinder in an optimum state.

2. The molding support device for an injection molding machine described in claim 1, wherein the material supplier is a hopper attached to the heating cylinder.

3. The molding support device for an injection molding machine described in claim 1, wherein a material supply apparatus is attached to the heating cylinder.

4. The molding support device for an injection molding machine described in claim 1, wherein the material supplier is a material drop port of the heating cylinder.

5. The molding support device for an injection molding machine described in claim 1, wherein the resin material is a pellet material.

6. The molding support device for an injection molding machine described in claim 1, wherein the basic data input unit has a control temperature manual input function capable of manually inputting at least a lower limit value of the control temperature.

7. The molding support device for an injection molding machine described in claim 1, wherein the basic data input unit has a function of inputting basic data including at least molding condition data relating to molding conditions and screw data relating to the form of the screw.

8. The molding support device for an injection molding machine described in claim 7, wherein the data processing unit comprises:
    an Operation expression data setting unit for setting a Solid-phase rate operation expression data for calculating a solid-phase rate of molten resin in the heating cylinder based on the basic data; and
    a calculation processing unit having a solid-phase rate calculation processing function unit for calculating an estimated solid-phase rate of molten resin at the end of measurement by the calculation processing based on the basic data and the Solid-phase rate operation expression data.

9. The molding support device for an injection molding machine described in claim 7, wherein the screw data includes data relating to the material type on the screw surface.

10. A molding support device for an injection molding machine which injects and fills a metal mold with a plasticized molten resin by a screw and molds the molten resin, comprising:
    a controller configured to control the temperature of a material supplier which supplies a resin material to an inside of a heating cylinder;
    a basic data input unit which can input at least a resin material type;
    a Controlled temperature data table in which an optimum control temperature by a temperature control unit is set for each resin material type;
    a data processing unit having a temperature setting processing unit which reads the optimum control temperature corresponding to the resin material type input from the basic data input unit at least when molding conditions are set, thereby setting a control temperature of the temperature control unit; and
    a molding machine controller having an output processing function unit which displays the control temperature on a display,
    wherein the basic data input unit has a function of inputting basic data including at least molding condition data relating to molding conditions and screw data relating to the form of the screw,
    wherein the screw data includes data relating to the material type on the screw surface, and
    wherein the data processing unit has a decomposition rate formula data for calculating the resin decomposition rate of the screw surface during molding is set in the Operation expression data setting unit based on the basic data, and the calculation processing function unit has the decomposition rate calculation processing function unit for calculating an estimated resin decomposition rate based on the basic data and a Decomposition rate operation expression data.

11. The molding support device for an injection molding machine described in claim 10, wherein the calculation data setting unit includes a temperature increase calculation processing function unit for calculating an estimated temperature increase based on the data relating to a shearing heat used in the calculation processing based on the decomposition rate calculation formula processing data, and wherein the calculation processing function unit includes a temperature increase calculation processing function unit for calculating the estimated temperature increase by the calculation processing based on the increase temperature calculation processing data.

12. The molding support device for an injection molding machine described in claim 11, wherein the output processing function unit includes a temperature increase display unit for displaying on the display the estimated temperature increase obtained by the temperature increase calculation processing function unit.

13. A molding support device for an injection molding machine which injects and fills a metal mold with a plasticized molten resin by a screw and molds the molten resin, comprising:

a controller configured to control the temperature of a material supplier which supplies a resin material to an inside of a heating cylinder;

a basic data input unit which can input at least a resin material type;

a Controlled temperature data table in which an optimum control temperature by a temperature control unit is set for each resin material type;

a data processing unit having a temperature setting processing unit which reads the optimum control temperature corresponding to the resin material type input from the basic data input unit at least when molding conditions are set, thereby setting a control temperature of the temperature control unit; and a molding machine controller having an output processing function unit which displays the control temperature on a display, wherein the data processing unit includes a resin temperature conversion processing function for setting the resin temperature conversion formula data for converting the control temperature into a resin material temperature based on at least part of the shape data of the resin material in the molding condition data and molding cycle time data, and for obtaining the resin material temperature by conversion processing based on the resin temperature conversion formula data.

14. The molding support device for an injection molding machine described in claim 13, wherein the output processing function unit includes a resin material temperature display unit for displaying on the display the resin material temperature obtained by the resin temperature conversion processing function.

15. The molding support device for the injection molding machine described in claim 10, wherein the calculation processing function unit includes a determination processing unit that performs determination processing on an estimated solid-phase rate and outputs the determination processing result.

16. The molding support device for the injection molding machine described in claim 10, wherein the calculation processing function unit includes a determination processing unit that performs determination processing on the degree of the estimated resin decomposition rate and outputs the result of the determination processing.

17. The molding support device for the injection molding machine described in claim 10, wherein the calculation processing function unit includes a determination processing unit that performs determination processing on an estimated solid-phase rate and the estimated resin decomposition rate and outputs the result of the determination processing.

18. The molding support device for the injection molding machine described in claim 15, wherein the output processing function unit includes a determination result display unit for displaying the result of the determination processing output from the determination processing unit.

19. The molding support device for the injection molding machine described in claim 16, wherein the output processing function unit includes a determination result display unit for displaying the result of the determination processing output from the determination processing unit.

* * * * *